US 11,970,275 B2

(12) United States Patent
Abramov et al.

(10) Patent No.: US 11,970,275 B2
(45) Date of Patent: Apr. 30, 2024

(54) AIR VEHICLE CONFIGURATIONS

(71) Applicant: ISRAEL AEROSPACE INDUSTRIES LTD., Lod (IL)

(72) Inventors: Danny Abramov, Lod (IL); Shay Hemo, Lod (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 17/583,467

(22) Filed: Jan. 25, 2022

(65) Prior Publication Data
US 2022/0234745 A1    Jul. 28, 2022

(30) Foreign Application Priority Data
Jan. 26, 2021    (IL) .......................................... 280432

(51) Int. Cl.
*B64D 27/24*    (2024.01)
*B64C 9/38*    (2006.01)
(Continued)

(52) U.S. Cl.
CPC .............. *B64D 27/24* (2013.01); *B64C 11/46* (2013.01); *B64C 29/0025* (2013.01);
(Continued)

(58) Field of Classification Search
CPC ....... B64C 9/38; B64C 11/46; B64C 29/0025; B64C 9/22; B64C 9/24; B64C 9/26; B64D 27/24
See application file for complete search history.

(56) References Cited

U.S. PATENT DOCUMENTS 7,992,827 B2    8/2011    Shepshelovich
8,109,473 B2    2/2012    Shepshelovich et al.
(Continued)

FOREIGN PATENT DOCUMENTS

EP    2899221 A1    7/2015
RU    171939 U1    6/2017
(Continued)

OTHER PUBLICATIONS

Motorizado, F-35 Lightning II Takeoff and Landing from Aircraft Carrier and Amphibious Assault Ship, Dec. 5, 2020, https://www.youtube.com/watch?v=bnl1rYJFVKU (Year: 2020).*
(Continued)

*Primary Examiner* — Timothy D Collins
*Assistant Examiner* — Justin Michael Heston
(74) *Attorney, Agent, or Firm* — Dorsey & Whitney LLP

(57) ABSTRACT

An air vehicle is provided including: a main lift generating wing arrangement having a port wing and a starboard wing, empennage and main propulsion system. The air vehicle further includes a distributed electrical propulsion (DEP) system having secondary electrical propulsion units coupled to each one of the port wing and the starboard wing. The main propulsion system is configured for providing sufficient thrust such as to enable powered aerodynamic flight of the air vehicle including at least: powered aerodynamic take off absent operation of the DEP system; and powered aerodynamic landing absent operation of the DEP system. The DEP system is configured for selectively providing at least augmented lift to the main lift generating wing arrangement in at least landing. A method for landing an air vehicle on a moving platform under separated wake conditions is also provided.

22 Claims, 17 Drawing Sheets

(51) Int. Cl.
  *B64C 11/46* (2006.01)
  *B64C 29/00* (2006.01)
  *B64U 50/13* (2023.01)
  *B64C 9/00* (2006.01)
(52) U.S. Cl.
  CPC ........ *B64U 50/13* (2023.01); *B64C 2009/005* (2013.01); *B64C 9/38* (2013.01)

(56) References Cited

U.S. PATENT DOCUMENTS

| | | | |
|---|---|---|---|
| 9,789,768 | B1 | 10/2017 | Meier |
| 10,099,793 | B2 | 10/2018 | Ullman et al. |
| 11,305,869 | B1 * | 4/2022 | Ward .................. B64C 9/24 |
| 2016/0297520 | A1 | 10/2016 | Sada-Salinas et al. |

FOREIGN PATENT DOCUMENTS

| | | |
|---|---|---|
| RU | 2696681 C1 | 8/2019 |
| RU | 192967 U1 | 10/2019 |
| WO | 2016055990 A1 | 4/2016 |
| WO | 2018208652 A1 | 11/2018 |
| WO | 2020058706 A1 | 3/2020 |

OTHER PUBLICATIONS

Agrawal, et al., Wind Tunnel Testing of a Blown Flap Wing, American Institute of Aeronautics and Astronautics, Jun. 2019.
Courtin et al., Feasibility Study of Short Takeoff and Landing urban Air Mobility Vehicles Using Geometric Programming, MIT International Center for Air Transportation (ICAT), Jun. 2018.
Courtin et al., Flight Test Results of a Subscale Super-Stol Aircraft, MIT International Center for Air Transportation (ICAT), Jan. 2020.
Electric Aviation for Today, Airflow.aero, 2021.
Patterson, et al., High-Lift Propeller System Configuration Selection for NASA's Sceptor Distributed Electric Propulsion Flight Demonstrator, American Institute of Aeronautics and Astronautics.

* cited by examiner

AIR VEHICLE CONFIGURATIONS

TECHNOLOGICAL FIELD

The presently disclosed subject matter relates to air vehicle configurations, in particular for STOL or SSTOL powered aerodynamic flight.

BACKGROUND

Conventional horizontal landing of a fixed-wing air vehicle (having a forward speed sufficient to sustain aerodynamic flight), particularly where the forward thrust vector is fixed with respect to the air vehicle, is conventionally accompanied by an increase in lift and reduction in air speed. Where the air vehicle is a powered air vehicle, landing is also conventionally accompanied by a reduction in engine power output, and the engine is often at idle during the landing maneuver until at least touchdown, to reduce airspeed and to provide a reasonable glide angle. However, the landing speed and landing ground roll is generally limited by the stall speed.

In general, in conventional horizontal landings the airspeed of the air vehicle is conventionally maintained above the respective stall speed, as long as the air vehicle is airborne. Furthermore, conventional horizontal landings are often accompanied with the deployment of high lift devices and the use of drag inducing devices together with controlling the thrust of the propulsion system, enabling increased glide angles to be achieved.

Such aircraft cannot conventionally execute a powered landing procedure when immersed in separated wake conditions, with respect to a slowly moving landing pad of limited length, for example on a helipad landing deck of a moving ship aft of a superstructure. Similarly, such aircraft cannot conventionally execute a powered landing procedure, or powered take-off, with respect to a static landing pad of limited length, for example air strips that are shorter than that conventionally required for the conventional air vehicle.

GENERAL DESCRIPTION

According to a first aspect of the presently disclosed subject matter there is provided an air vehicle comprising a main lift generating wing arrangement comprising a port wing and a starboard wing, empennage and main propulsion system, and further comprising a distributed electrical propulsion (DEP) system comprising a first plurality of secondary electrical propulsion units coupled to each one of said port wing and said starboard wing,
  wherein the main propulsion system is configured for providing sufficient thrust such as to enable powered aerodynamic flight of the air vehicle including at least:
  (a) powered aerodynamic take off absent operation of the DEP system; and
  (b) powered aerodynamic landing absent operation of the DEP system; and
  wherein the DEP system is configured for selectively providing at least augmented lift to the main lift generating wing arrangement in at least landing.

In at least some examples, the DEP system is configured for providing said augmented lift to the main lift generating wing arrangement in separated wake conditions and for selectively concurrently generating enhanced drag such as to enable the air vehicle to provide at least powered aerodynamic landing at said separated wake conditions and at a landing air speed significantly less than the nominal stall speed of the air vehicle absent operation of the DEP system.

For example, said separated wake conditions correspond to freestream conditions generally expected on a landing pad of a moving seafaring platform. For example, said landing air speed is an airspeed not greater than 30 knots or not greater than 32 knots.

Additionally or alternatively, for example, the air vehicle comprises a control system configured for operating said DEP system to execute a landing maneuver.

Additionally or alternatively, for example, said DEP system is optimized for damping separated wake conditions over the lift generating wing arrangement while providing augmented lift and enhanced drag.

Additionally or alternatively, for example, each said first plurality of said secondary electrical propulsion units is mechanically coupled to the respective said wing.

Additionally or alternatively, for example, each said secondary electrical propulsion units is coupled to the main lift generating wing arrangement via a respective coupling.

Additionally or alternatively, for example, each said secondary electrical propulsion units comprises an electrical motor unit that is configured for operating to turn a respective driveshaft about a respective rotor axis, and a respective rotor mounted to the driveshaft. For example, each rotor is in the form of a single propeller having a plurality of blades. Additionally or alternatively, for example, each said rotor has a respective rotor diameter, circumscribed by the tips of the respective blades as they turn about the respective rotor axis. For example, the secondary electrical propulsion units of each one of said first plurality of secondary electrical propulsion units are spaced over each one of said port wing and said starboard wing at an inter-rotor spacing between each adjacent pair of said secondary electrical propulsion units, wherein said inter-rotor spacing are each less than a respective rotor diameter of the respective said rotor of the respective adjacent pair of said secondary electrical propulsion units. For example, a ratio of inter-rotor spacing to rotor diameter ratio can be within any one of the following ranges: 0.15 to 0.00; −0.15 to 0.30; −0.15 to 0.40; 0.05 to 0.40; 0.05 to 0.30; 0.05 to 0.20; 0.05 to 0.15. Additionally or alternatively, for example, the ratio of inter-rotor spacing to rotor diameter ratio can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40.

Alternatively, for example, in at least some examples, the ratio of inter-rotor spacing to rotor diameter ratio can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.45, 0.50, 0.55, 0.60, 0.65, 0.70, 0.75, 0.80.

Alternatively, for example, in at least some other examples, the ratio of inter-rotor spacing to rotor diameter ratio can be any one of the following values: 0.81, 0.85, 0.90, 0.95, 0.99, 1.00, 1.05, 1.10, 1.15, 1.20, 1.25, 1.30, 1.35, 1.40, 1.45, 1.50.

Additionally or alternatively, for example, each one of said port wing and said starboard wing comprises a flap arrangement and an aileron arrangement, and wherein each said first plurality of secondary electrical propulsion units comprises a respective first set of secondary electrical propulsion units coupled to the respective port wing or starboard wing such as to provide corresponding jet flows directly to the full flap arrangement of the respective said port wing or starboard wing, and a respective second set of secondary electrical propulsion units coupled to the respective port wing or starboard wing such as to provide corresponding jet flows directly to the aileron arrangement of the respective said port wing or starboard wing.

Additionally or alternatively, for example, said secondary electrical propulsion units of each said first plurality are laterally distributed over the full length of the respective said port wing or starboard wing.

Additionally or alternatively, for example, the DEP system is configured for providing control moments in roll at air speed significantly less than the nominal stall speed of the air vehicle absent operation of the DEP system.

Additionally or alternatively, for example, each one of said port wing and said starboard wing comprises a flap arrangement and an aileron arrangement, and wherein said secondary electrical propulsion units each said first plurality of secondary electrical propulsion units are coupled to the respective port wing or starboard wing such as to provide corresponding jet flows directly only to the full flap arrangement of the respective said port wing or starboard wing. For example, the air vehicle has an absence of secondary electrical propulsion units coupled to the respective port wing or starboard wing such as to provide corresponding jet flows directly to the aileron arrangement of the respective said port wing or starboard wing. Additionally or alternatively, for example, said secondary electrical propulsion units of each said first plurality are laterally distributed over a portion of the length of the respective said port wing or starboard wing.

Alternatively, for example, each one of said port wing and said starboard wing comprises a flap arrangement and an aileron arrangement, and wherein said secondary electrical propulsion units each said first plurality of secondary electrical propulsion units are coupled to the respective port wing or starboard wing such as to provide corresponding jet flows directly only to the part of the flap arrangement of the respective said port wing or starboard wing. For example, the air vehicle has an absence of secondary electrical propulsion units coupled to the respective port wing or starboard wing such as to provide corresponding jet flows directly to the aileron arrangement of the respective said port wing or starboard wing. Additionally or alternatively, for example, said secondary electrical propulsion units of each said first plurality are laterally distributed over a portion of the length of the respective said port wing or starboard wing.

Additionally or alternatively, for example, each one of said port wing and said starboard wing is based on a two-element aerofoil design along the full span of the respective wing.

Additionally or alternatively, for example, said empennage is in the form of boom tail, including twin booms and a horizontal stabilizer. For example, said main propulsion system is in the form of a pusher propeller driven by a suitable engine and configured such that in operation of the main propulsion system a jet of air propelled aft by the pusher propeller augments an airflow over the horizontal stabilizer.

Additionally or alternatively, for example, the air vehicle is configured for providing control moments in pitch at air speeds significantly less than the nominal stall speed of the air vehicle absent operation of the DEP system.

Additionally or alternatively, for example, the DEP system is configured for providing control moments in yaw at air speed significantly less than the nominal stall speed of the air vehicle absent operation of the DEP system.

According to a second aspect of the presently disclosed subject matter there is provided a method for landing an air vehicle on a moving platform under separated wake conditions, comprising:
(a) providing an air vehicle as defined regarding the first aspect of the presently disclosed subject matter;
(b) operating the air vehicle to carry out a landing maneuver comprising:
at a predetermined altitude and range from the platform, operating the DEP system to enable generating said augmented lift and said enhanced drag to the air vehicle;
operating the air vehicle to match the ground speed of the air vehicle to the ground speed of the platform;
reducing altitude of the air vehicle until touchdown on the platform.

For example, said air vehicle is travelling at a forward air speed that is less than said nominal stall speed.

Additionally or alternatively, for example, said moving platform comprises a seafaring vessel. For example, said seafaring vessel comprises a superstructure forward of a landing pad of the seafaring vessel, and wherein said superstructure generates said separated wake conditions at said landing pad.

Additionally or alternatively, for example, said platform forward air speed is about 30 knots or about 32 knots.

Additionally or alternatively, for example, the method comprises operating the main propulsion unit to provide enhanced airflow over at least part of the empennage to thereby provide control moments in at pitch at air speed significantly less than the nominal stall speed of the air vehicle absent operation of the DEP system and at separated wake conditions.

Additionally or alternatively, for example, the method comprises operating the DEP system to provide control moments in roll at air speed significantly less than the nominal stall speed of the air vehicle absent operation of the DEP system and at separated wake conditions.

According to a third aspect of the presently disclosed subject matter there is disclosed a method for converting a conventional take off and landing (CTOL) air vehicle to a short take off and landing (STOL) air vehicle or to a super short take off and landing (SSTOL) air vehicle, comprising:
(A) providing the CTOL air vehicle, the CTOL air vehicle comprising a main lift generating wing arrangement comprising a port wing and a starboard wing, empennage and main propulsion system, the main propulsion system configured for enabling aerodynamic powered flight of the air vehicle within a flight envelope including at least conventional landing and take off;
(B) providing a distributed electrical propulsion system (DEP system) comprising a two first pluralities of secondary electrical propulsion units, wherein the DEP system is configured for selectively providing at least augmented lift to the main lift generating wing arrangement in at least landing;
© coupling one of said two first plurality of secondary electrical propulsion units to said port wing, and coupling the other one of said two first plurality of secondary electrical propulsion units to said starboard wing.

For example, the DEP system is configured for providing said augmented lift to the main lift generating wing arrangement in separated wake conditions and for selectively concurrently generating enhanced drag such as to enable the air vehicle to provide at least powered aerodynamic landing at said separated wake conditions and at a landing air speed significantly less than the nominal stall speed of the air vehicle absent operation of the DEP system.

Additionally or alternatively, for example, each said secondary electrical propulsion units comprises an electrical motor unit that is configured for operating to turn a respective driveshaft about a respective rotor axis, and a respective rotor mounted to the driveshaft, each rotor having a respective rotor diameter, and wherein in step (C) the secondary electrical propulsion units of each one of said first plurality of secondary electrical propulsion units are spaced over each one of said port wing and said starboard wing at an inter-rotor spacing between each adjacent pair of said secondary electrical propulsion units, wherein said inter-rotor spacing are each less than a respective rotor diameter of the respective said rotor of the respective adjacent pair of said secondary electrical propulsion units. For example, the method includes at least one of the following:

wherein a ratio of inter-rotor spacing to rotor diameter ratio can be within any one of the following ranges: 0.15 to 0.00; −0.15 to 0.30; −0.15 to 0.40; 0.05 to 0.40; 0.05 to 0.30; 0.05 to 0.20; 0.05 to 0.15; and.

wherein a ratio of inter-rotor spacing to rotor diameter ratio can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40;

wherein a ratio of inter-rotor spacing to rotor diameter ratio can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.45, 0.50, 0.55, 0.60, 0.65, 0.70, 0.75, 0.80.

wherein a ratio of inter-rotor spacing to rotor diameter ratio can be any one of the following values: 0.81, 0.85, 0.90, 0.95, 0.99, 1.00, 1.05, 1.10, 1.15, 1.20, 1.25, 1.30, 1.35, 1.40, 1.45, 1.50.

Additionally or alternatively, for example, each one of said port wing and said starboard wing comprises a flap arrangement and an aileron arrangement, and wherein in step (C) a respective first set of secondary electrical propulsion units of each said first plurality of secondary electrical propulsion units is coupled to the respective port wing or starboard wing such as to provide corresponding jet flows directly to the full flap arrangement of the respective said port wing or starboard wing, and a respective second set of secondary electrical propulsion units each of each said first plurality of secondary electrical propulsion units is coupled to the respective port wing or starboard wing such as to provide corresponding jet flows directly to the aileron arrangement of the respective said port wing or starboard wing. For example, in step (C) said secondary electrical propulsion units of each said first plurality are laterally distributed over the full length of the respective said port wing or starboard wing.

In at least another example, each one of said port wing and said starboard wing comprises a flap arrangement and an aileron arrangement, and wherein in step (C) a respective first set of secondary electrical propulsion units of each said first plurality of secondary electrical propulsion units is coupled to the respective port wing or starboard wing such as to provide corresponding jet flows directly only to the full flap arrangement of the respective said port wing or starboard wing. For example, in step (C) said secondary electrical propulsion units of each said first plurality are laterally distributed over a portion of the length of the respective said port wing or starboard wing.

In at least another example, each one of said port wing and said starboard wing comprises a flap arrangement and an aileron arrangement, and wherein in step (C) a respective first set of secondary electrical propulsion units of each said first plurality of secondary electrical propulsion units is coupled to the respective port wing or starboard wing such as to provide corresponding jet flows directly only to a portion of said flap arrangement of the respective said port wing or starboard wing. For example, in step (C) said secondary electrical propulsion units of each said first plurality are laterally distributed over a portion of the length of the respective said port wing or starboard wing.

According to a fourth aspect of the presently disclosed subject matter there is provided a kit for converting a conventional take off and landing (CTOL) air vehicle configuration to a short take off and landing (STOL) air vehicle configuration or to a super short take off and landing (SSTOL) air vehicle configuration, the CTOL air vehicle configuration comprising a main lift generating wing arrangement comprising a port wing and a starboard wing, empennage and main propulsion system, the main propulsion system configured for enabling aerodynamic powered flight of the air vehicle within a flight envelope including at least conventional landing and take off, the kit comprising:

a plurality of secondary electrical propulsion modules, each said secondary propulsion unit module configured for being selectively and removably coupled to the CTOL air vehicle configurations to provide a variety of different STOL air vehicle, and wherein when coupled to the CTOL air vehicle configuration the plurality of secondary electrical propulsion modules provide a DEP system configured, when coupled to the CTOL air vehicle configuration, for selectively providing at least augmented lift to the main lift generating wing arrangement in at least landing.

For example, each said secondary propulsion unit module comprises an electrical motor unit that is configured for operating to turn a respective driveshaft about a respective rotor axis, and a respective rotor mounted to the driveshaft. For example, each rotor is in the form of a single propeller having a plurality of blades.

Additionally or alternatively, for example, the kit comprises an electrical speed controller (ESC) configured for controlling rotational speed of the respective rotor according to command signals from a controller configured for controlling the DEP system. For example, groups of said secondary electrical propulsion modules share the same ESC.

Alternatively, or example, groups of said secondary electrical propulsion modules connect the respective ESC to a group controller, which is in turn operatively connected to a controller configured for controlling the DEP system.

Additionally or alternatively, for example, each said secondary propulsion unit module is reversibly mechanically coupleable to a respective said wing via a respective coupling. For example, said coupling comprises a respective module operative interface configured for operatively coupling with a corresponding air vehicle body coupling interface affixed to the CTOL air vehicle configuration, to thereby enable operative coupling of the respective secondary electrical propulsion module with the CTOL air vehicle configuration. For example, the module operative interface comprises a load bearing module strut, having a first strut end and a longitudinal opposite second strut end, wherein the respective electrical motor unit is mechanically mounted to first strut end, and wherein the second strut end is configured for being mechanically coupled to the air vehicle body coupling interface.

Additionally or alternatively, for example, each said secondary electrical propulsion modules comprises a module electrical coupling and electrical cable connecting the module electrical coupling to the electrical motor unit, and wherein the module electrical coupling is configured for reversibly electrically coupling to a complementary wing electrical coupling provided in the CTOL air vehicle configuration and in electrical communication with an electrical power source.

A feature of at least one example according to the presently disclosed subject matter is that the effective stall speed of a basic aircraft configuration can be significantly reduced via installation and operation of the DEP system.

Another feature of at least one example according to the presently disclosed subject matter is that augmented lift and enhanced drag can be provided at low forward speed conditions (i.e., less than the nominal stall speed) and at separated wake conditions.

Another feature of at least one example according to the presently disclosed subject matter is that pitch, yaw and roll control can be provided at low forward speed conditions (i.e., less than the nominal stall speed) and at separated wake conditions.

Another feature of at least one example according to the presently disclosed subject matter is that STOL or SSTOL capability can be provided to a CTOL aircraft configuration.

Another feature of at least one example according to the presently disclosed subject matter is that the DEP system itself can be configured for providing full jet flow over the full wing, or only over the full flap extent of the wing, or only over part of the flap extent of the wing with respect to a CTOL aircraft configuration.

Another feature of at least one example according to the presently disclosed subject matter is that the DEP system can be optimized to provide desired flows over different parts of the wing, for example different flows over the flaps as compared with over the ailerons, for example by optimizing one or more of rotor diameter, rotor rpm, rotor angle, inter-rotor spacing and so on.

Another feature of at least one example according to the presently disclosed subject matter is that a CTOL aircraft configuration can be provided with a DEP system and operated to provide an essentially VTOL landing capability with respect to a moving platform.

Another feature of at least one example according to the presently disclosed subject matter is that a DEP system can be provided in kit form for a CTOL aircraft configuration, enabling reversible retrofit of modular portions of the DEP system to suit particular mission profiles.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
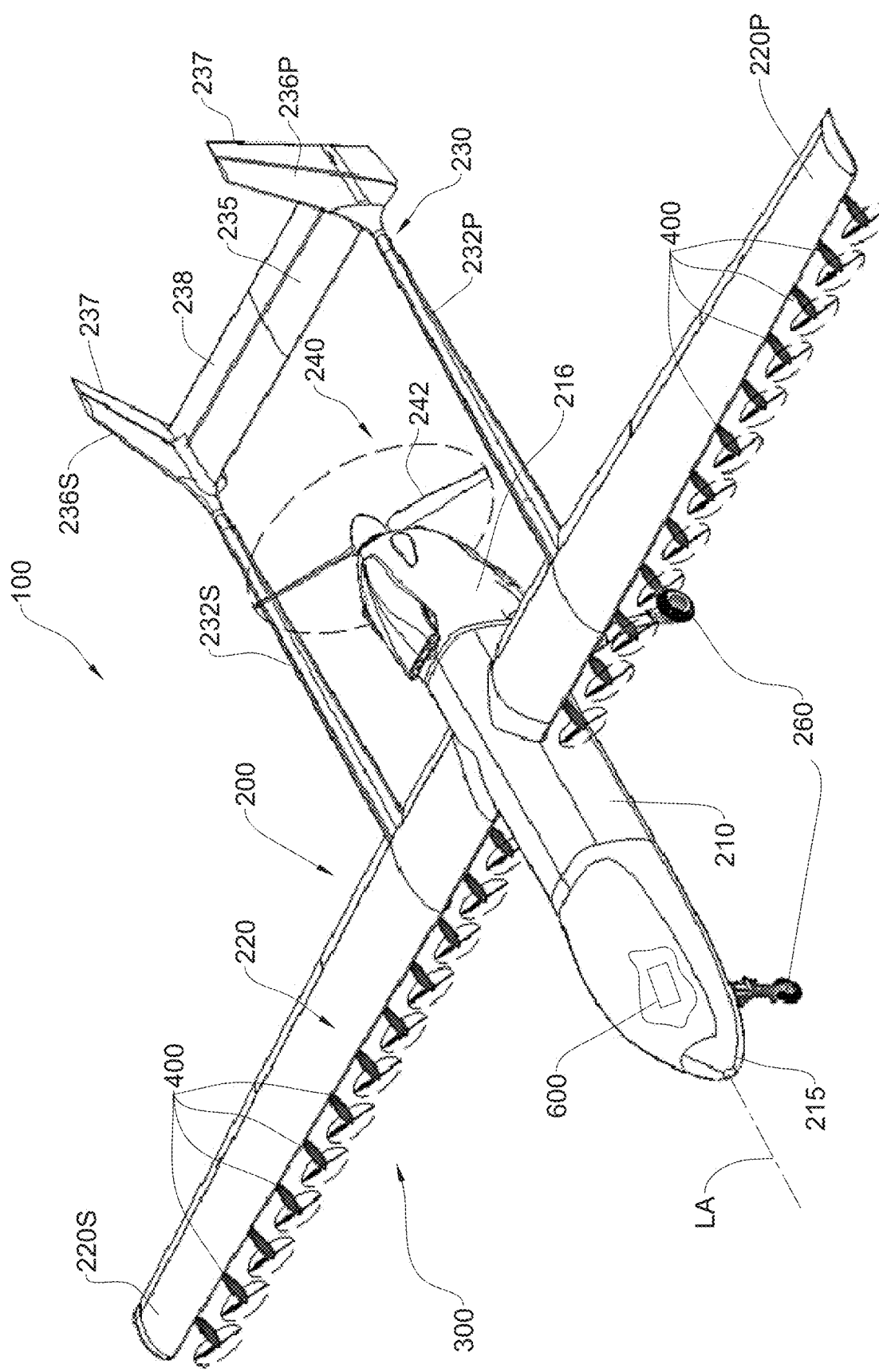
FIG. 1 is an isometric view of an air vehicle according to a first example of the presently disclosed subject matter.

According to a first aspect of the presently disclose subject matter, and referring to FIGS. 1 to 4, a first example of an air vehicle, generally designated with reference numeral 100, comprises a baseline aircraft design 200. The basic aircraft design 200 is a fully flyable fixed wing powered air vehicle, including a fuselage 210, a main lift generating wing arrangement 220, empennage 230 and main propulsion system 240.

According to this aspect of the presently disclose subject matter, the air vehicle 100 further comprises a distributed electrical propulsion system (DEP) 300, as will become clearer herein.

Figure 5:
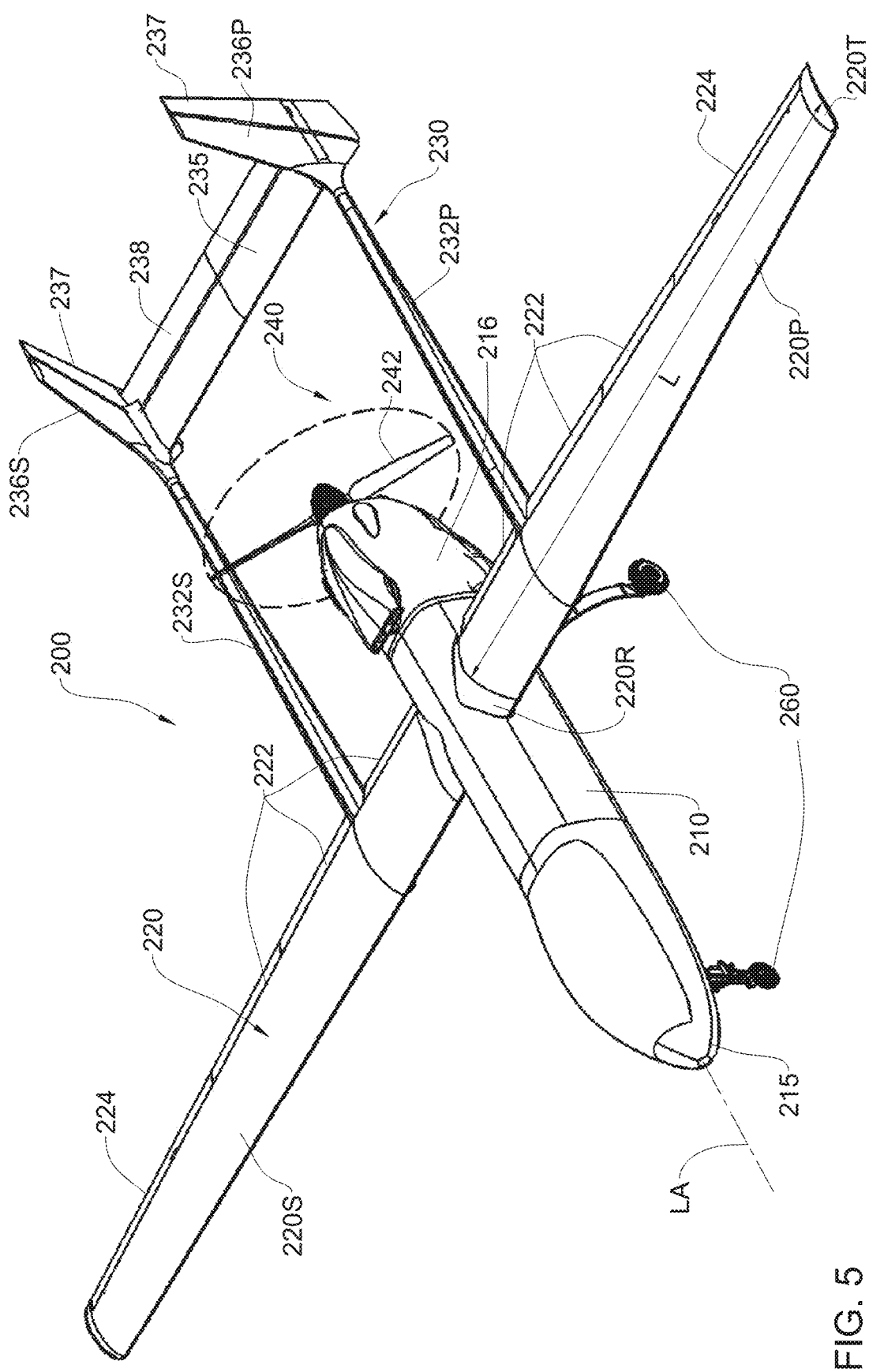
FIG. 5 is an isometric view of a basic aircraft design corresponding to the air vehicle example of FIG. 1.

For example, and referring also to FIG. 5, the basic aircraft design 200 can be based on or correspond to an existing aircraft design. For example, the basic aircraft design 200 can be based on or correspond to the aircraft design of the T-Heron or variants thereof, provided by Israel Aerospace Industries Ltd (IAI), Israel.

In any case, in at least this example, the air vehicle 100 is configured as an unmanned aerial vehicle (UAV) capable of being operated autonomously and/or automatically and/or via remote control, throughout at least part of the flight envelope of the basic aircraft design 200 as well as the whole flight envelope of the air vehicle 100 itself. However, in alternative variations of this example, the air vehicle can instead be configured as a manned vehicle, optionally including passengers and/or cargo.

Furthermore, in at least this example, the air vehicle 100 is configured as a subsonic air vehicle, and the basic aircraft design 200 is also configured as a subsonic air vehicle.

In at least this example, the air vehicle 100 also comprises an undercarriage 260, configured for enabling at least soft landing of the air vehicle, and also for enabling take-off, and comprises a tricycle undercarriage. In alternative variations of this example the undercarriage is configured only for soft landing, and is not used for take-off; for example the air vehicle can take off using an ejectable trolley, or can be air launched from a carrier aircraft, etc., and can use skid undercarriage for landing, for example.

In at least this example, the fuselage 210 is of general conventional design, being generally elongate along a longitudinal axis LA of the air vehicle 100, and having a nose 215 and an aft end 216.

In at least this example the main lift generating wing arrangement 220 is configured for generating aerodynamic lift for enabling aerodynamic flight for the basic aircraft design 200 and comprises a port wing 220P and a starboard wing 220S, affixed to the fuselage 210, and the port wing 220P and the starboard wing 220S are configured for generating aerodynamic lift.

In at least this example, each one of the port wing 220P and the starboard wing 220S is based on a two-element aerofoil design along the full span of the wings. In this connection, two-element slotted aerofoils are well known, and are disclosed for example in U.S. Pat. Nos. 8,109,473, 7,992,827, and WO 2016/055990, assigned to the present assignee. In alternative variations of this example, each one of the port wing 220P and the starboard wing 220S is at least partly based on a two-element aerofoil design.

Figure 6:
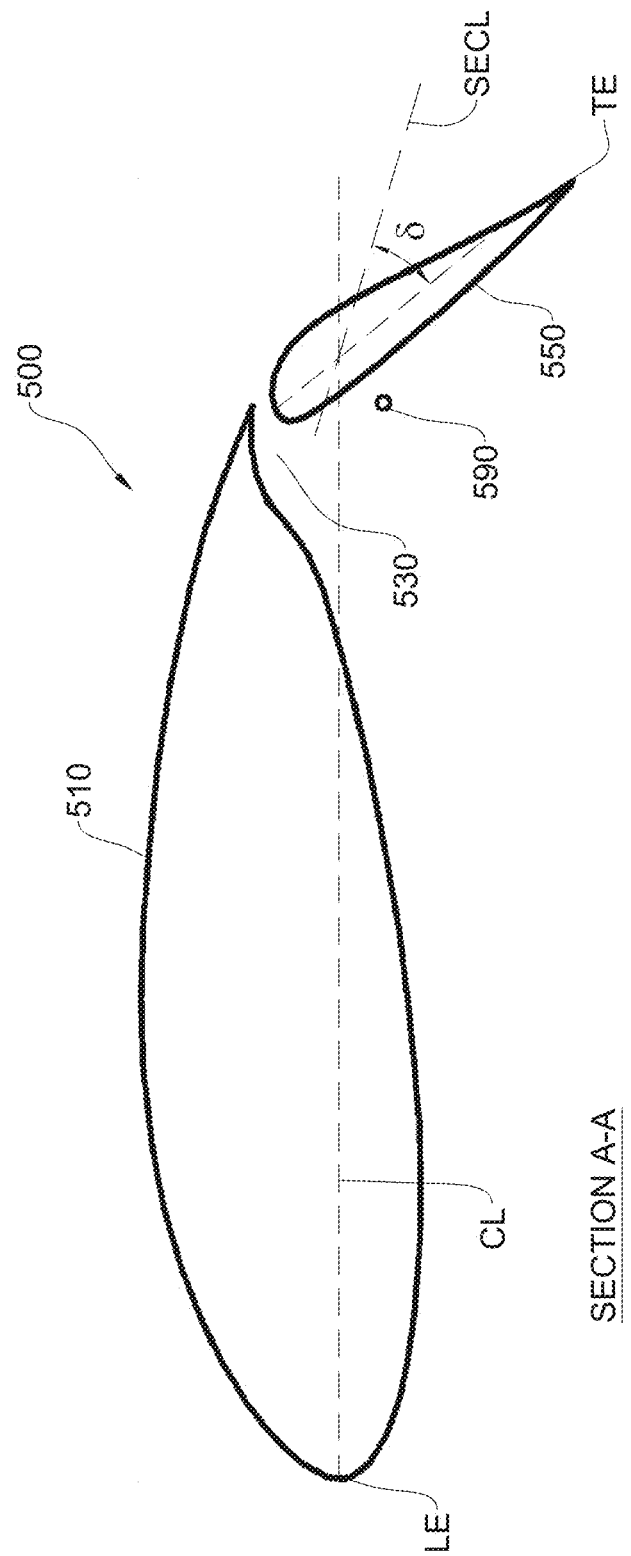
FIG. 6 is a cross-sectional view of an aerofoil of the example of FIG. 4 taken along A-A.

Referring to FIG. 6 in particular, such slotted aerofoils 500 are two-element aerofoils composed of a first element (the main aerofoil body) 510, and a second element (for example in the form of a flap or aileron) 550. The first element 510 comprises the leading edge LE of the aerofoil 500. The second element 550 comprises the trailing edge TE of the aerofoil 500 and is separated from the first element 510 by a slot 530 which is open for the airflow at any deflection of the second element 550. In one class of such slotted aerofoils, and in at least the present example, the slot 530 is permanent, and facilitates actuation of the second element 550 through positive or negative deflection angles $\delta$. Such slotted aerofoils 500 can be designed for cruising/loitering flight at high lift coefficients, and rely on a second element rotation around an external fixed hinge point 590 for adjustment of the aerofoil to different flight regimes. In alternative variations of this example, the second element 550 is rigidly connected with respect to the first element 510, providing a mechanically simple arrangement with high maximum lift characteristics.

The chord line CL of the aerofoil 500 can be defined, for example, as a line passing through the leading edge LE, such that the lift coefficient Ci of the aerofoil at zero angle of attack is about 1, with the flap angle also being zero. For example, such a flap angle of zero is defined such as to enable the second element 550 to pivot about hinge point 590 by positive and negative flap angles each of at least 25°. The second element chord line SECL of the second element 550 is thus at an angle $\delta_0$ with respect to the chord line CL. Thus, flap angles $\delta$ for the second element 550 are measured from the position of the second element chord line SECL which is at angle $\delta_0$ with respect to the chord line CL. It is to be noted that with respect to high-lift, long endurance wings of some UAV's, such as for example the Heron high-lift long endurance UAV, manufactured by IAI, Israel, optimum endurance performance is achieved via high loitering lift coefficients, which requires high maximum lift.

Figure 2:
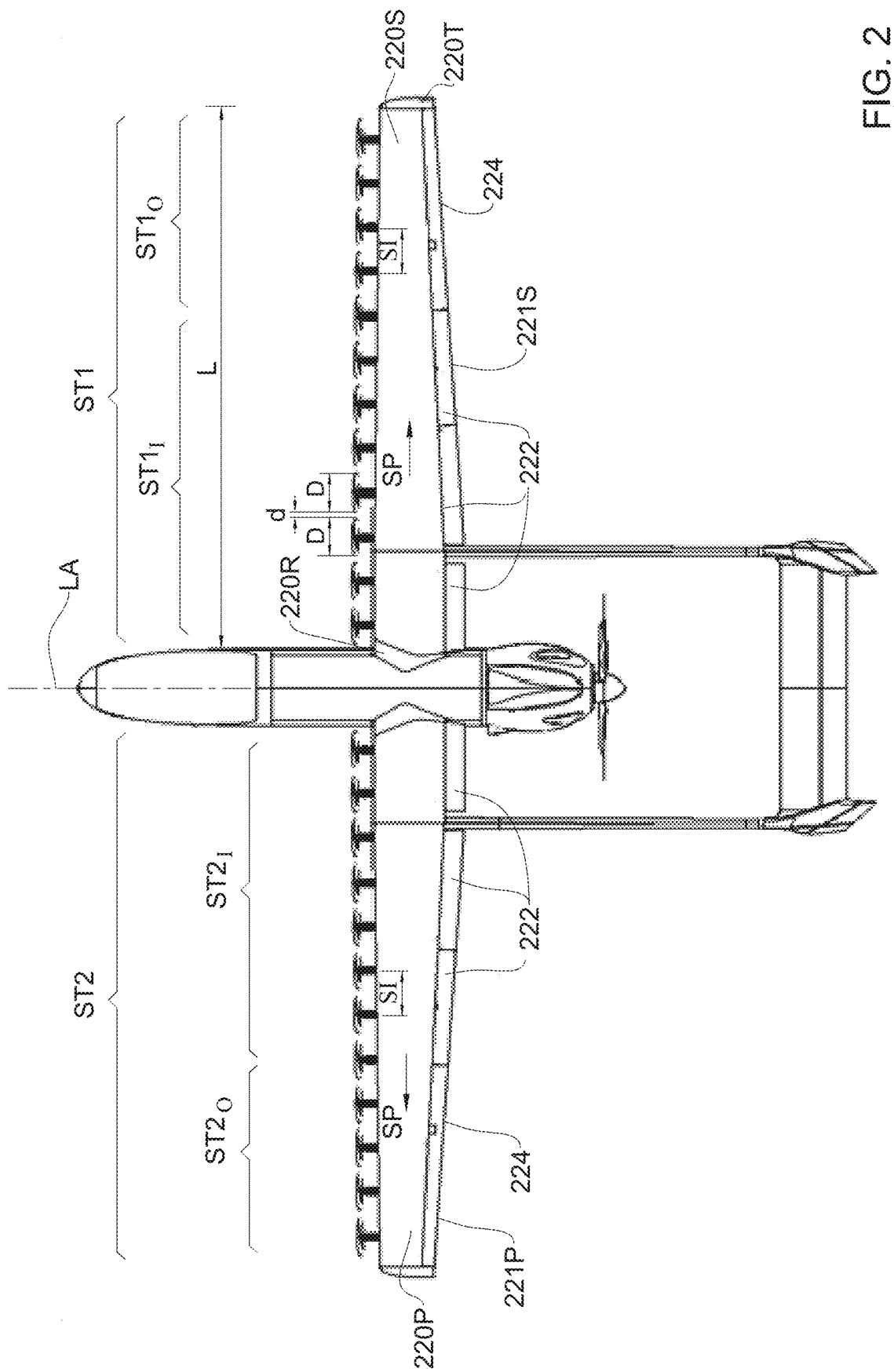
FIG. 2 is a plan view of the example of FIG. 1.
Figure 3:
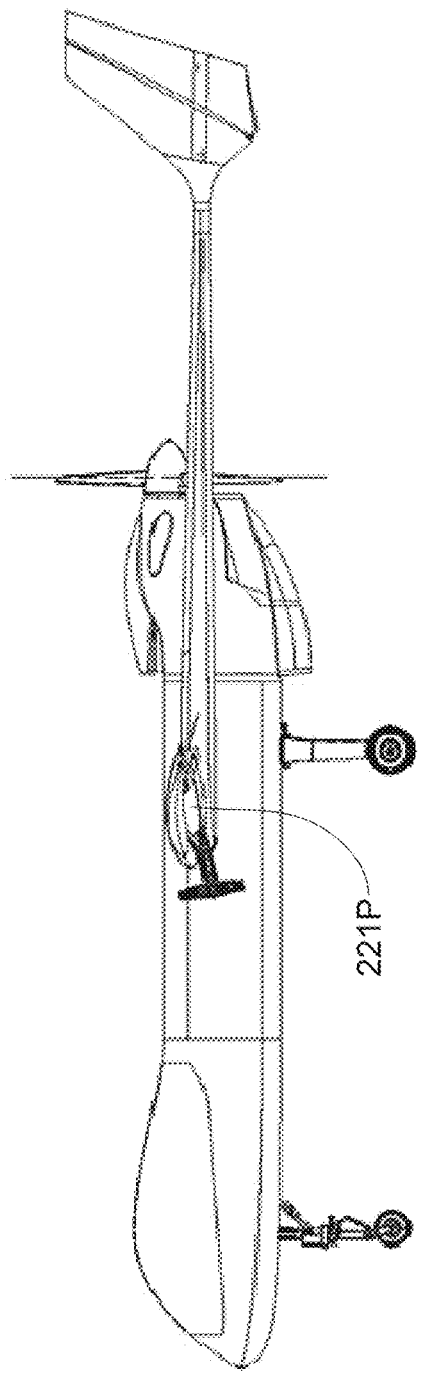
FIG. 3 is a side view of the example of FIG. 1.
Figure 4:
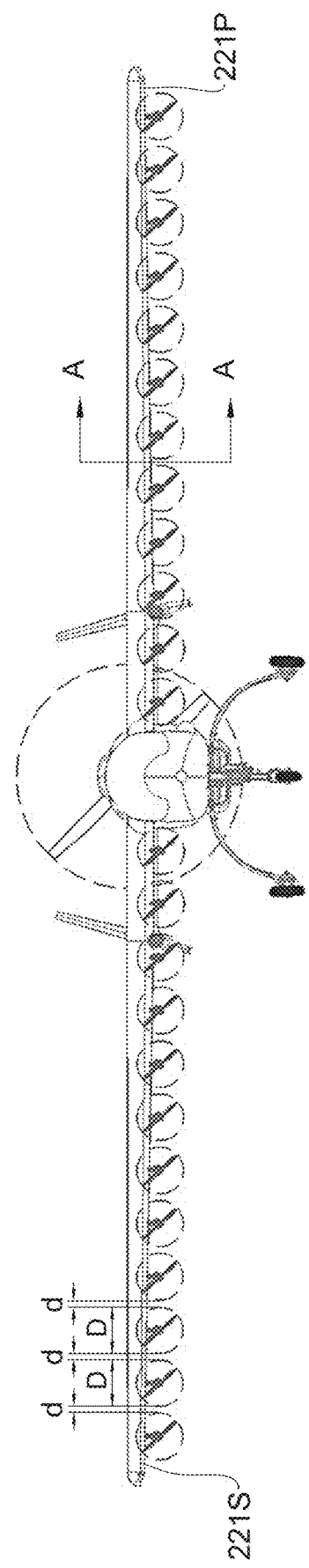
FIG. 4 is a front view of the example of FIG. 1.

Referring in particular to FIGS. 2 and 5, an inboard portion of each one of the port wing 220P and the starboard wing 220S comprises a respective arrangement of flaps 222 (each corresponding to the second element 550 of the respective aerofoil 500), each flap 222 being configured for being selectively pivotable about a pivot axis (typically co-axial with hinge point 590 of the respective aerofoil 500) within a range of flap angles $\delta_f$, from 0° to any one of about 20°, 30°, 35°, 40° or 60°, for example. According to an aspect of the presently disclosed subject matter, when the DEP system 300 is in operation, the flaps 222 can be operated to provide flap angles $\delta_f$ to induce optimized augmented lift and accompanying drag, for example during a landing maneuver or during a take off maneuver. For example, without operating the DEP 300 a landing maneuver can be implemented with flap angle $\delta_f$ of about 60°, while in cases where the DEP 300 is operated, the optimal flap angle may be significantly less, for example in the region of 35°, for example.

In at least this example, the flaps 222 can additionally be pivoted about negative flap angles $\delta_f$, for enabling decambering of the aerofoil, and thus additionally flaps 222 can additionally be pivoted about negative flap angles $\delta_f$ from 0° to any one of about −10°, −15°, −20°, −25°, for example.

In at least this example, the flaps 222 are configured for conventionally providing the following modes: decambering mode, cruise mode, high lift mode, airbrake mode (high lift and high drag).

In at least this example, each one of the port wing 220P and the starboard wing 220S comprises three flaps 222.

Referring again to FIGS. 2 and 5 in particular, an outboard portion of each one of the port wing 220P and the starboard wing 220S comprises a respective aileron 224 (corresponding to the second element 550 of the respective aerofoil 500), configured for being selectively pivotable about a respective pivot axis (typically co-axial with hinge point 590 of the respective aerofoil 500) within a range of deflection angles $\delta_a$, from 0° to about ±25°. The ailerons 224 are controllable for providing roll control moments to the air vehicle 100.

In at least this example, and referring in particular to FIGS. 1 and 5, the empennage 230 is in the form of boom tail, including twin booms 232P, 232S, a port boom 232P extending aft from the port wing 220P, and a starboard boom 232S extending aft from the starboard wing 220S. A horizontal stabilizer 235 is connected to the aft ends of the port boom 232P and the starboard boom 232S, and comprises an elevator 238, controllable for providing pitch control moments to the air vehicle 100. The empennage also comprises twin vertical stabilizers 236P, 236S, including a port vertical stabilizer 236P at the aft end of port boom 232P, and a starboard vertical stabilizer 236S at the aft end of starboard boom 232S. Each vertical stabilizer 236P, 236S comprises a respective rudder 237, controllable for providing yaw control moments to the air vehicle 100. In alternative variations of this example, the empennage can have any other suitable configuration (with the configuration of the main propulsion system 240 being suitable therefor), for example any one of the following: a high boom tail; boom-mounted inverted V configuration; T-tail; V-tail; H-tail; and so on.

In at least this example, the main propulsion system 240 is in the form of a pusher propeller 242 driven by a suitable engine (not shown), and mounted at the aft end 216 of the fuselage 210. In at least this example, in operation of the main propulsion system 240, the jet of air propelled aft by the propeller 242 augments the airflow over the horizontal stabilizer 235, enabling enhanced pitch control even at relatively low speeds. In at least this example, the engine is a combustion engine, for example an internal combustion engine, run on fossil fuel.

Figure 18:
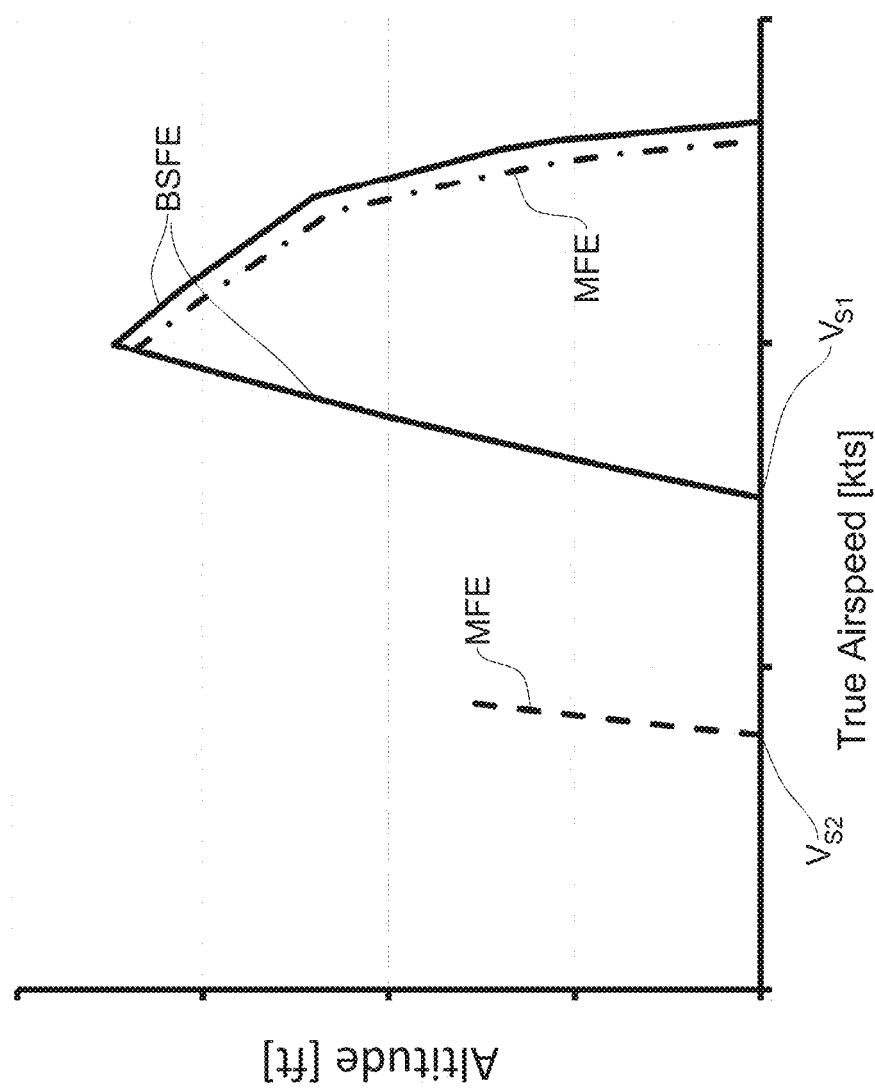
FIG. 18 schematically compares a baseline flight envelope corresponding to the basic aircraft design example of FIG. 1, with a modified flight envelope of the air vehicle of the example of FIG. 1.

In at least this example, and referring also to FIG. 18, the main propulsion system 240 is configured for enabling aerodynamic powered flight of the air vehicle within a baseline flight envelope BSFE, including at least:
 (a) (conventional) powered aerodynamic take off, absent operation of the DEP 300; and
 (b) (conventional) powered aerodynamic landing, absent operation of the DEP 300.

In at least this example, the basic aircraft design 200 is configured for conventional take off and landing (CTOL) operations, enabling full powered flight of the air vehicle 100, absent operation of the DEP 300 (or absent the DEP 300 itself).

In other words, and referring to FIG. 18 the basic aircraft design 200 is such as to enable the air vehicle 100 to fully function within the full extent of the BSFE, absent operation of the DEP 300 (or absent the DEP 300 itself). The BSFE includes, as well as powered take off and powered landing, also cruise, loiter, climb, ceiling, and so on, in which the air vehicle 100 is powered solely by the main propulsion system 240, i.e., absent operation of the DEP 300 or absent the DEP 300 altogether. In this example, the air vehicle 100 absent operation of the DEP 300 or absent the DEP 300 altogether, similarly to the basic aircraft design 200, operates at forward speeds greater than the nominal stall speed $V_{S1}$. The nominal stall speed $V_{S1}$ is this the stall speed limit for the air vehicle 100 absent operation of the DEP 300 or absent the DEP 300 altogether, i.e., the stall speed limit for the basic aircraft design 200.

According to at least this aspect of the presently disclosed subject matter, the DEP 300 is configured for selectively providing at least augmented lift to the main lift generating wing arrangement 220 in at least one of take off and landing. In particular, the DEP 300 is optimized for selectively providing at least augmented lift to the main lift generating wing arrangement in at least one of take off and landing.

In at least one implementation of at least this example, the DEP system 300 is configured for providing the aforementioned augmented lift to the main lift generating wing arrangement 220 in separated wake conditions and for selectively concurrently generating enhanced drag such as to enable the air vehicle 100 to provide at least powered aerodynamic landing at separated wake conditions and at a landing air speed significantly less than the nominal stall speed of the air vehicle absent operation of the DEP system 300.

By "separated wake conditions" is meant conditions normally encountered in a flow medium comprising a plurality of pockets of separated flow originating behind a bluff body or a blunt body. It is known that aerodynamic effects aft of such a bluff body or blunt body attenuates with distance away from the respective body—thus the closer to the respective body, the more pronounced are the effects of the bluff body or blunt body on the airstream.

According to an aspect of the presently disclosed subject matter, operation of the DEP 300 enables the air vehicle 100 to approach and effectively be controllably flown in the wake of such a bluff body or blunt body, relatively close to the body, for example at distances in the order of the fuselage length.

Thus, when the DEP 300 is operated according to this aspect of the presently disclosed subject matter, this operation enables the air vehicle 100 to operate under powered aerodynamic flight in a modified flight envelope MFE (see FIG. 18), in which the modified stall speed $V_{S2}$ is significantly less than the nominal stall speed $V_{S1}$.

The reduction in stall speed from nominal stall speed $V_{S1}$ to modified stall speed $V_{S2}$ is achieved, according to this aspect of the presently disclosed subject matter, by operating the DEP 300 to provide augmented lift over the main lift generating wing arrangement 220, thereby significantly increasing the maximum lift coefficient CL of the air vehicle 100 from the nominal maximum lift coefficient $C_{Lmax1}$ to the modified maximum lift coefficient $C_{Lmax2}$.

Referring again to FIGS. 1 to 4, in at least this example, the DEP 300 comprises a plurality of secondary electrical propulsion units 400 mechanically coupled to the main lift generating wing arrangement 220.

Figure 7:
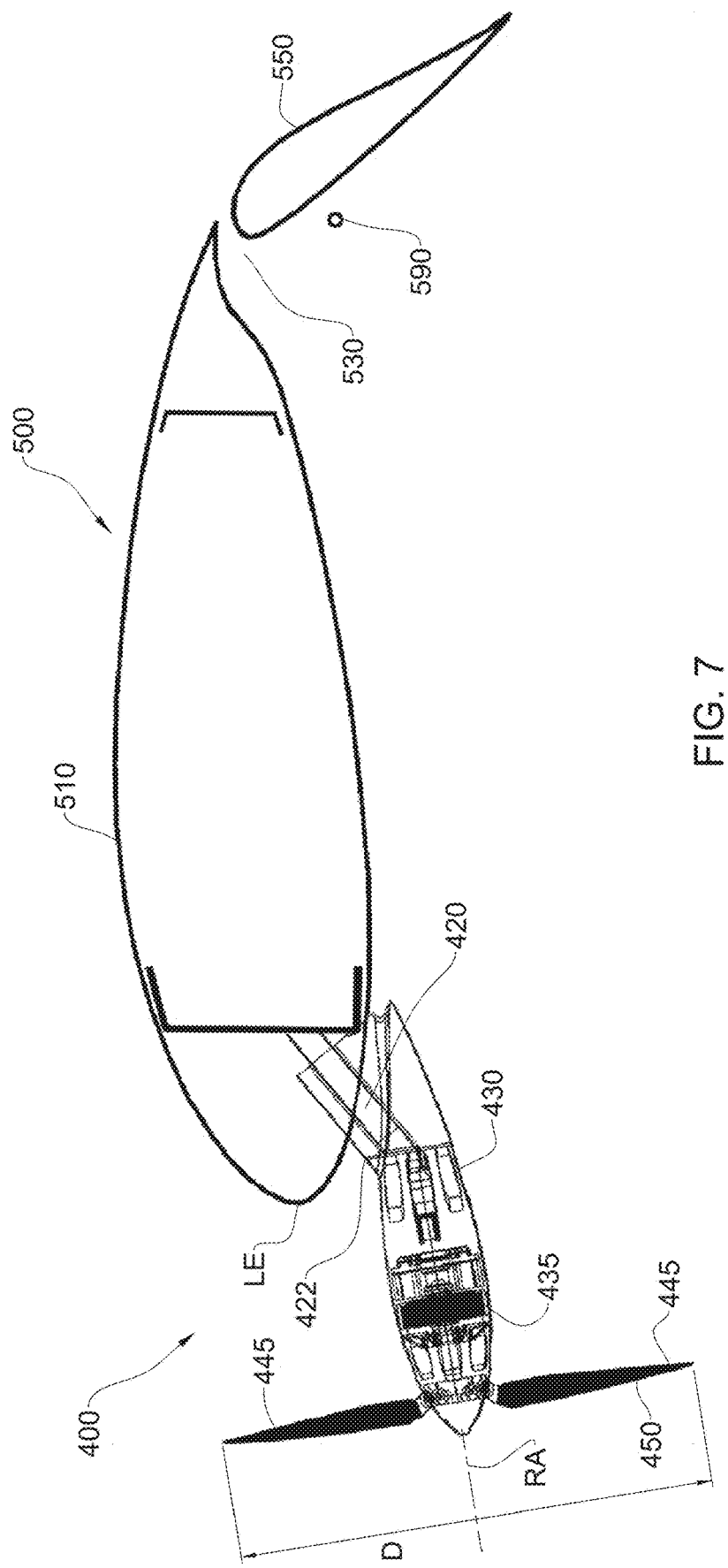
FIG. 7 is a cross-sectional side view of the wing of the example of FIG. 4 taken at A-A.

Referring in particular to FIG. 7, each secondary electrical propulsion unit 400 is coupled to the main lift generating wing arrangement 220 via a coupling 420. Each secondary electrical propulsion unit 400 comprises an electrical motor unit 430 (which can include one or more electrical motors) that operates to turn a driveshaft 436 about a respective rotor axis RA, and a rotor 450 is mounted to the driveshaft 436. Each motor unit 430 is enclosed in a respective cowling 435. In at least this example, the rotor 450 is in the form of a single propeller having a plurality of blades 445, for example 2, 3, 4, 5, 6, or more than 6 blades. The rotor 450 has a respective rotor diameter D, circumscribed by the tips of the blades 445 as they turn about the respective rotor axis RA. The coupling 420 includes an internal strut (not shown in this figure) that couples the secondary electrical propulsion unit 400 to the wing 220 (for example to the main wing spar thereof) in a load bearing manner. An aerodynamic fairing 422 covers the strut.

Each electrical motor unit 430 is in electrical communication with an electrical power source (not shown), for example batteries, comprised in the air vehicle 100, for example inside the main lift generating wing arrangement 220 and/or fuselage 210 via suitable wiring, for example. Additionally or alternatively, the electrical power source can include a suitable electrical generator, for example comprised in the air vehicle 100. In at least this example, each electrical motor unit 430 is also controllable by the control unit 600 (FIG. 1) of the air vehicle 100, for example via suitable wiring. An electrical speed controller (ESC) (not shown) controls rotational speed of the rotor 450 according to command signals from the controller 600. In alternative variations of this example, groups of electrical motor units 430 can share the same ESC. In yet other alternative variations of this example, groups of electrical motor units 430 can connect the respective ESC to a group controller, which is in turn operatively connected to the controller 600.

Figure 8:
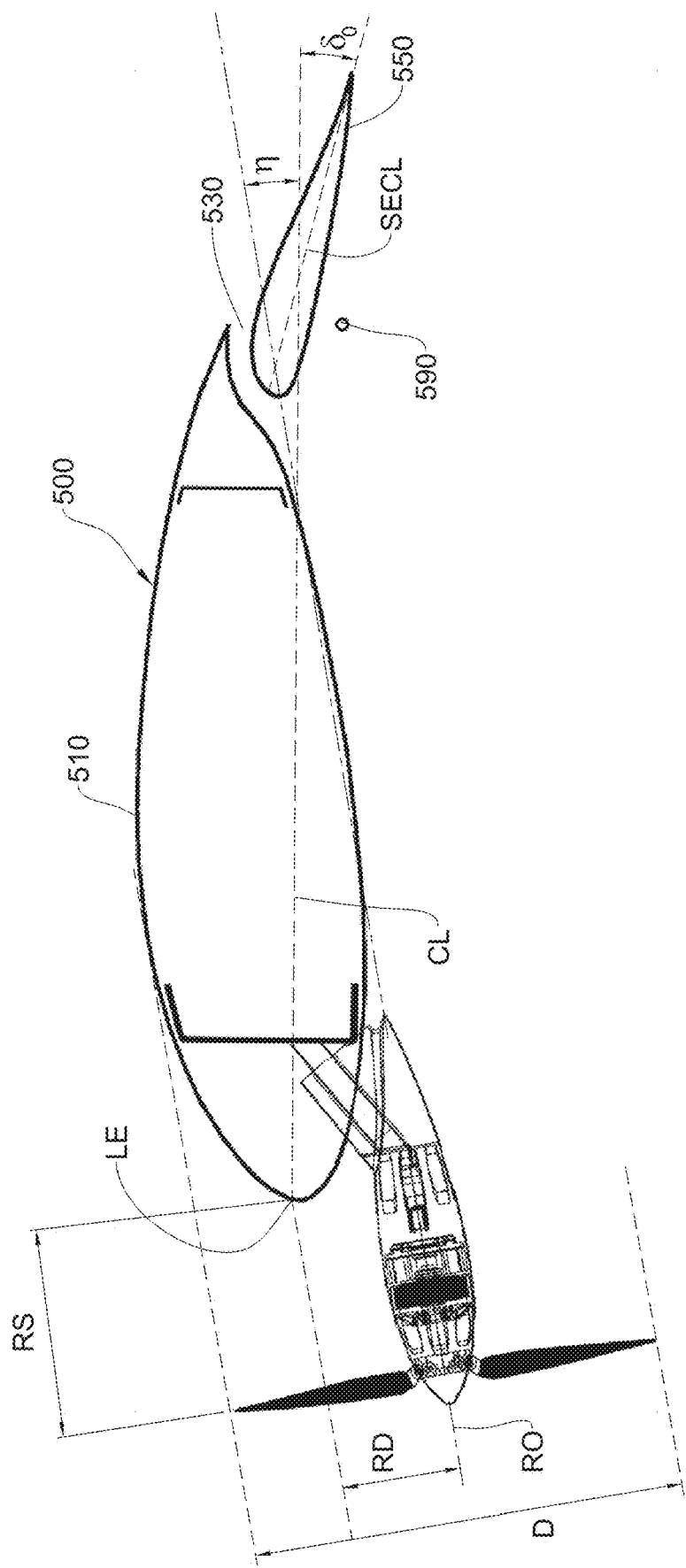
FIG. 8 illustrates a variety of geometrical parameters associated with the example of FIG. 7.

Referring to FIG. 8 in particular, for each electrical motor unit 430, the respective rotor 450 is spaced forward of the leading edge LE of the main lift generating wing arrangement 220 by a respective rotor spacing RS taken along a direction parallel to the rotor axis RA. Furthermore, for each electrical motor unit 430, the respective rotor axis RA is at an angle η to the chord line CL at the respective aerofoil station corresponding to the rotor axis RA. Furthermore, for each electrical motor unit 430, the respective to the rotor axis RA is laterally displaced from the respective aerofoil leading edge LE at aerofoil station corresponding by a rotor displacement RD.

In particular, starboard wing 220S comprises a first set ST1 of N secondary electrical propulsion units 400 mechanically coupled to the starboard wing 220S, and the port wing 220P comprises a second set ST2 of N secondary electrical propulsion units 400 mechanically coupled to the port wing 220P. While in the illustrated example, the integer N is 12, in alternative variations of this example the integer N can have any other suitable value.

In at least this example, and referring in particular to FIG. 2, the secondary electrical propulsion units 400 in each one of the first set ST1 and the second set ST2 have the same rotor diameter D. In at least this example, the secondary electrical propulsion units 400 in each one of the first set ST1 and the second set ST2 are spaced from one another in a respective spanwise direction SP from the longitudinal axis LA of the air vehicle 100 at an inter-unit spacing SI such that each rotor 450 is laterally spaced from an adjacent rotor by an inter-rotor spacing d, wherein d is significantly smaller than rotor diameter D. In at least this example, the rotor diameter D, the inter-rotor spacing d and the inter-unit spacing SI are uniform in each one of the first set ST1 and the second set ST2.

It is to be noted that in at least some alternative variations of this example, the rotor diameter D, and/or the inter-rotor spacing d, and/or the inter-unit spacing SI are non-uniform within each one of the first set ST1 and the second set ST2.

It is further to be noted that each of the secondary electrical propulsion units 400 in each one of the first set ST1 and the second set ST2 can be operated to run at the same rpm, or at different rpms from one another.

In some examples, the rotors 450 of adjacent secondary electrical propulsion units 400 can be in overlapping relationship such that the planes of such rotors 450 are in longitudinal staggered relationship. In such cases, the inter-rotor spacing to rotor diameter ratio DSR can be zero or negative.

In at least this example, for example, the inter-rotor spacing to rotor diameter ratio DSR can be within any one of the following ranges: 0.15 to 0.00; −0.15 to 0.30; −0.15 to 0.40; 0.05 to 0.40; 0.05 to 0.30; 0.05 to 0.20; 0.05 to 0.15.

In at least this example, for example, the inter-rotor spacing to rotor diameter ratio DSR can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40.

In at least some alternative variations of this example, for example, the inter-rotor spacing to rotor diameter ratio DSR can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.45, 0.50, 0.55, 0.60, 0.65, 0.70, 0.75, 0.80.

Without being bound to theory, inventors consider that as the inter-rotor spacing to rotor diameter ratio DSR is increased there is less damping effect over the wings with respect to the freestream conditions, and the amount of augmented lift decreases.

Particularly in alternative variations of this example, in which there is less need or no need to provide a damping effect over the wings with respect to the freestream conditions, the inter-rotor spacing to rotor diameter ratio DSR can also be greater than 0.4 or 0.8, for example any one of: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.45, 0.50, 0.55, 0.60, 0.65, 0.70, 0.75, 0.80, 0.81, 0.85, 0.90, 0.95, 0.99, 1.00, 1.05, 1.10, 1.15, 1.20, 1.25, 1.30, 1.35, 1.40, 1.45, 1.50.

In at least this example, all the rotors 450 in the port wing 220P rotate in the same rotational direction with respect to one another. Also in at least this example, all the rotors 450 in the starboard wing 220S also rotate in the same rotational direction with respect to one another. Also in at least this example, the rotors 450 in the port wing 220P rotate in the opposite rotational direction with respect to the rotor 450 in the starboard wing 220S.

Furthermore, the number N of secondary electrical propulsion units 400 in each one of the first set ST1 and the second set ST2 is such as to span the full lateral length L of the respective port wing 220P or of the respective starboard wing 220S, from the respective wing root 220R to the respective wing tip 220T.

According to this aspect of the presently disclosed subject matter, a first subset, $ST1_I$ and $ST2_I$ respectively, of each one of said first set ST1 of N secondary electrical propulsion units 400 and said second set ST2 of N secondary electrical propulsion units 400, are mechanically coupled to an inboard section of the respective starboard wing 220S and port wing 220P. In particular, the secondary electrical propulsion units 400 of the first subsets $ST1_I$ and $ST2_I$ are configured for providing respective air flows over the respective flaps 222 of the respective starboard wing 220S and port wing 220P. In this manner, the specific secondary electrical propulsion units 400 of the first subsets $ST1_I$ and $ST2_I$ are configured for providing augmented lift as well as enhanced drag by means of the increased airflow provided over the respective wing, as well as by operating the flaps to a large deflection angle, for example 30° to 40° deflection. For example, the spacing RS, rotor displacement RD, angle η, are optimized to maximize the augmented lift effect and enhanced drag effect in cooperation with relatively large flap angles.

In such an example, and referring to FIGS. 2, 3, 4, 8 in particular, the respective secondary electrical propulsion units 400 of the first subsets $ST1_I$ and $ST2_I$ can be positioned with respect to the respective starboard wing 220S and port wing 220P such that a majority of the airflow jet generated by the respective rotors 450 is directed to flow over the pressure surfaces 221S, 221P, of the respective starboard wing 220S and port wing 220P, to thereby energize the flow over the flaps 222 via the slot 530, and such that the respective flaps 222 each maximizes its turning effect with respect to this airflow jet, thereby contributing to the augmented lift as well as enhanced drag.

Concurrently, in at least this example, a second subset, $ST1_O$ and $ST2_O$ respectively, of each one of said first set ST1 of N secondary electrical propulsion units 400 and said second set ST2 of N secondary electrical propulsion units 400, are mechanically coupled to an outboard section of the respective starboard wing 220S and port wing 220P. In particular, the secondary electrical propulsion units 400 of the second subsets $ST1_O$ and $ST2_O$ are configured for providing respective air flows over the respective ailerons 224 of the respective starboard wing 220S and port wing 220P. In this manner, the specific secondary electrical propulsion units 400 of the second subsets ST1$_O$ and ST2$_O$ are configured for providing sufficient airflow over the ailerons 224 such as to enable roll control even at low airspeeds wherein the absence of operation of the DEP 300 there would otherwise be insufficient airflow over the ailerons 224 to provide such roll control. For example, the spacing RS, rotor displacement RD, angle η, are optimized to maximize controllability of the ailerons 224 at low air speeds and at separated wake conditions.

Furthermore, the secondary electrical propulsion units 400 of the second subsets ST1$_O$ and ST2$_O$ can be operated for providing respective air flows over the respective ailerons 224 of the respective starboard wing 220S and port wing 220P such as to provide yaw control. For example, one or more of the specific secondary electrical propulsion units 400 of the second subsets ST1$_O$ and ST2$_O$ can be operated to provide differential thrust port-starboard, and thereby enable yaw control even at low airspeeds wherein the absence of operation of the DEP 300 there would otherwise be insufficient airflow over the vertical stabilizers to provide such yaw control.

For example, in at least such an example, the respective secondary electrical propulsion units 400 of the second subsets ST1$_O$ and ST2$_O$ can be positioned with respect to the respective starboard wing 220S and port wing 220P such that a relatively equal proportions of the airflow jet generated by the respective rotors 450 are directed to flow over each one of the pressure surface and the suction surface of each one of the respective starboard wing 220S and port wing 220P, to thereby maximize the efficacy of the ailerons 224 to provide controllable roll moments at low airspeeds. Alternatively, for example, the respective secondary electrical propulsion units 400 of the second subsets ST1$_O$ and ST2$_O$ can be positioned with respect to the respective starboard wing 220S and port wing 220P such that a relatively larger proportion of the airflow jet generated by the respective rotors 450 is directed to flow over the pressure surface than with respect to the suction surface of each one of the respective starboard wing 220S and port wing 220P.

It is to be noted that in practice for a given thrust generated by each secondary electrical propulsion unit 400, as the flap angle of the respective aileron 224 or flap 222 downstream of the secondary electrical propulsion unit 400 is increased within its operating limits, lift is also increased and drag is also increased, and thus there is a reduction in net thrust generated by the motor 400 (thrust of secondary electrical propulsion unit 400 less increase in drag). Thus, in the case of the flap 222, and as will become clearer herein, the flap angle for the flaps can be controlled such that the increase in drag is greater than the thrust contribution of the respective secondary electrical propulsion unit 400; such a net increase in drag can be compensated by operating the main propulsion unit 240 to generate higher thrust. In the case of the aileron 224, the level of thrust from the respective secondary electrical propulsion unit 400 can be controlled such as to provide just enough lift augmentation to operate for roll control.

Figure 10C:
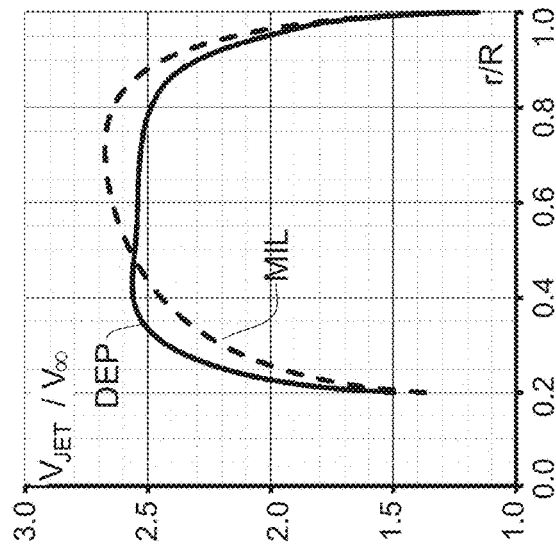
FIG. 10(c) schematically illustrates an example of jet velocity distribution with radial location along rotor blades of the example of FIG. 10(a).
Figure 10B:
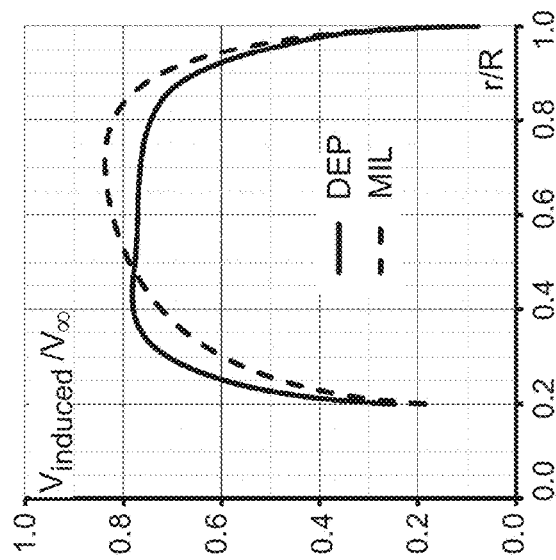
FIG. 10(b) schematically illustrates an example of induced axial velocity distribution with radial location along rotor blades of the example of FIG. 10(a)

Referring to FIG. 10 (a), FIGS. 10(b) and 10(c), in at least this example, the blades 445 (referred to as "DEP" in these figures) are optimized for generating high jet velocity rather than for providing high efficiency for a desired thrust, and are also configured for provide damping of the otherwise separated wake airflow over the wing 220 that can occur in separated wake conditions around the wing 220. For example, such separated wake conditions can occur in atmospheric environment around buildings or close to a ship superstructure, in particular when these are close to a landing patch or landing pad. For a give thrust, the DEP blades provide greater average axial induced velocity than the equivalent MIL (minimum induced losses) blades, but the DEP blades are operated at higher rpm than the MIL blades. Said differently, for the same rpm, MIL blades provide greater power and thrust than DEP blades. In one example, MTh blades turning at 7400 rpm generate 2660W power and 84N thrust, while DEP blades turning at 7384 rpm generate 2420W power (about 9% less than the DEP blades) and 78N thrust (about 8% less than the DEP blades).

Figure 10A:
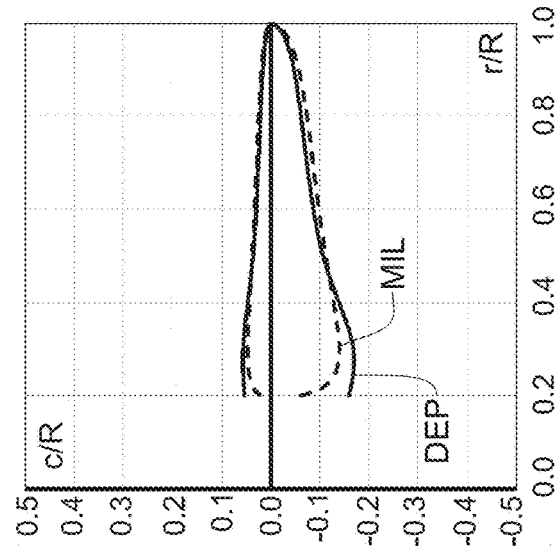
FIG. 10(a) schematically illustrates distribution of chord length with radial location of the rotor blades for the example of FIG. 1.

As illustrated in FIG. 10(a), a MTh profile of induced axial velocity downstream of the rotor vs. radial location from the blade root to the blade tip provides a peak induced axial velocity outboard of the radial midpoint position on the blade. Thus the majority of the average jet velocity V$_J$ is contributed to by the outboard half of the blade. Such a MTh blade has a relative smooth distribution of chord length vs radial location from the blade root to the blade tip, as illustrated in FIG. 10(b) and FIG. 10(c), in which the maximum chord length is not at the blade root, but instead at a radial location close to the 50% position.

In contrast, and referring again to FIG. 10(a), the DEP blades 445, at least according to this example, have a much larger chord length at the root than the MTh blade, and the chord length quickly reduces to less than that of the MTh blade at radial locations of about 40% till the blade tip. Furthermore, the chord length at the root in the DEP blade 445 can be about double than at the 50% radial location. This blade profile for blade 445 provides a damping profile of induced axial velocity downstream of the rotor vs. radial location from the blade root to the blade tip, in which the peak induced axial velocity is now inboard of the radial midpoint position on the blade 445. Thus, the majority of the average jet velocity V$_J$ is contributed to by the inboard half of the blade.

Induced jet velocity V$_{induced}$ is the local increase in jet velocity at the rotor location. This is related to the jet velocity V$_{jet}$ (downstream of the rotor) and the freestream velocity V$_\infty$ by the expression:

$$V_{jet}=V_\infty+2*V_{induced}$$

Thus, and without being bound to theory, it is considered that the portions of the air jet generated by the rotor 450 closest to the surfaces of the wing 220 are more energized in an axial direction that in the case of a DEP blade, and thus serve to dampen any separated wake flow that would otherwise impinge on these surfaces. Furthermore, the relatively high induced jet velocity close to the hub of the rotors also contributes to the aforesaid damping regarding the flow aft of the hub of the respective secondary electrical propulsion unit 400.

The actual augmented lift and enhanced drag generated by operating the DEP 300 are related to the jet velocity V$_{jet}$ (in particular in relation to the freestream air velocity V$_\infty$, i.e., in relation to V$_{jet}$/V$_\infty$)), the respective lift coefficient C$_L$ or the respective drag coefficient C$_D$, air density ρ (related to altitude), and frontal area S of the rotor disc (i.e., of a disc having a diameter corresponding to the diameter D of the rotor 450).

For a given thrust T generated by a particular secondary electrical propulsion unit 400, jet velocity V$_{jet}$ can be maximized by minimizing the frontal area S of the rotor disc, for a given set of freestream conditions (freestream air velocity $V_\infty$, freestream dynamic pressure $q_\infty$), according to the relationship:

$$(V_{jet}/V_\infty)^2 = 1 + (T/(q_\infty * S))$$

Thus, in at least the present example, the DEP 300 can be optimized for sea-level operations, in which $V_\infty$ is in the region of about 30 knots or about 32 knots. In at least one example of such a case, each secondary electrical propulsion unit 400 can be configured for providing a thrust of 7 Kgf using a rotor 450 of diameter 38 cm (15 inch), for an air vehicle 100 of weight about 600 kg and having a total of 24 secondary electrical propulsion units 400.

In a typical landing maneuver, the air vehicle 100 is in a downward glide path defined by a glide angle ($\gamma$). For example, the glide angle ($\gamma$) can be in the range of between $-3°$ to about $-10°$, or from $-0.5°$ to about $-10°$. The glide angle ($\gamma$) is related to thrust level (T) generated by the air vehicle and the overall drag (DR) generated by the air vehicle by the expression:

$$\sin(\gamma) \sim (T-DR)/L$$

According to an aspect of the presently disclosed subject matter, the DEP 300 is configured to generate large values of enhanced drag concurrently with augmented lift (which provides low landing velocity) in airbrake mode—the high drag thus compensates for the increased lift at landing, to maintain similar values of the lift-to-(drag–thrust) ratio (L/(DR–T)), and thus maintain similar values of (negative) glide angle $\gamma$ as for the basic aircraft configuration 200, i.e., in the absence of the DEP 300.

Operation of the DEP 300 to generate augmented lift can also generate enhanced drag DR (in combination with providing large flap angles for the flaps 222) which is directed in a direction opposed to the aggregate thrust TA generated by operation of the DEP 300. The parameter $C_X$, known as the streamwise force coefficient for the air vehicle in the longitudinal direction, is related to the drag coefficient $C_D$ and the thrust coefficient $C_T$ of the air vehicle, associated with operation of the DEP 300 by the relationship:

$$C_X = C_T - C_D$$

It is to be noted that this expression is a simplification, and assumes that the drag coefficient $C_D$ and the thrust coefficient $C_T$ are both acting in a direction parallel to the longitudinal axis of the air vehicle 100. Where this is not the case, the expression needs to be modified to take account of the vector directions of the coefficients with respect to the longitudinal axis.

In at least one implementation of operation of this example, the drag DR generated by operation of the DEP 300 (including providing large flap angles for the flaps 222) can exceed the aggregate thrust TA generated by operation of the DEP 300, and thus streamwise force coefficient $C_X$ can be negative. Since the basic aircraft design 200 is such as to enable conventional powered landing absent operation of the DEP 300, the basic aircraft design 200 can generate sufficient drag to provide conventional powered landings absent operation of the DEP 300. Thus, if the DEP 300 is operated during a powered landing such that total drag generated is greater than the total thrust, there is an excess in drag, and thus the primary propulsion unit 240 can then be operated to generate more thrust than would otherwise be used to compensate for the excess drag, to thereby provide a negative streamwise force coefficient $C_X$ of similar value as for the basic aircraft design 200, and thus without significantly affecting the glide angle. In turn, the increased thrust generated by the primary propulsion unit 240 provides energized airflow at least over the horizontal stabilizer 235, enabling generation of enhanced control moments in pitch even at low forward speeds associated with the landing maneuver.

In at least another implementation of operation of the DEP 300, the drag DR generated by operation of the DEP 300 (including providing large flap angles for the flaps 222) can be less than the aggregate thrust TA generated by operation of the DEP 300, and thus streamwise force coefficient $C_X$ is positive. In this case, the levels of augmented lift and enhanced drag generated by aforesaid operation of the DEP 300 enables the air vehicle 100 to climb at a higher rate than the basic aircraft design 200. In at least this example, the rotor blades 445 are foldable in an aft direction about hinges at the respective blade roots, such as to enable the blades 445 to pivot backwards to an undeployed position close to the respective cowling 435. This arrangement can provide a minimize drag configuration when the air vehicle 100 is operating absent operation of the DEP 300, for example at cruise or loiter, or when landing or taking off in a conventional manner.

However, it is to be noted that operation of the air vehicle 100 at any part of the BSFE even with the DEP 300 not being in operative action, incurs a drag penalty (for example 5%), as compared with the basic aircraft design 200 (i.e., absent the DEP 300 itself). Such a drag penalty, while varying according to where the air vehicle 100 is operating in the BSFE, remains so long as the DEP 300 is coupled to the basic aircraft design 200. Thus, with the air vehicle 100, there is still a greater drag penalty with the folded blades 445 (and DEP 300 not being in operation) at every part of the flight envelope, such that the maximum airspeed available for the air vehicle 100 and the ceiling are each diminished as compared with the basic aircraft configuration 200 (see FIG. 18).

Figure 9:
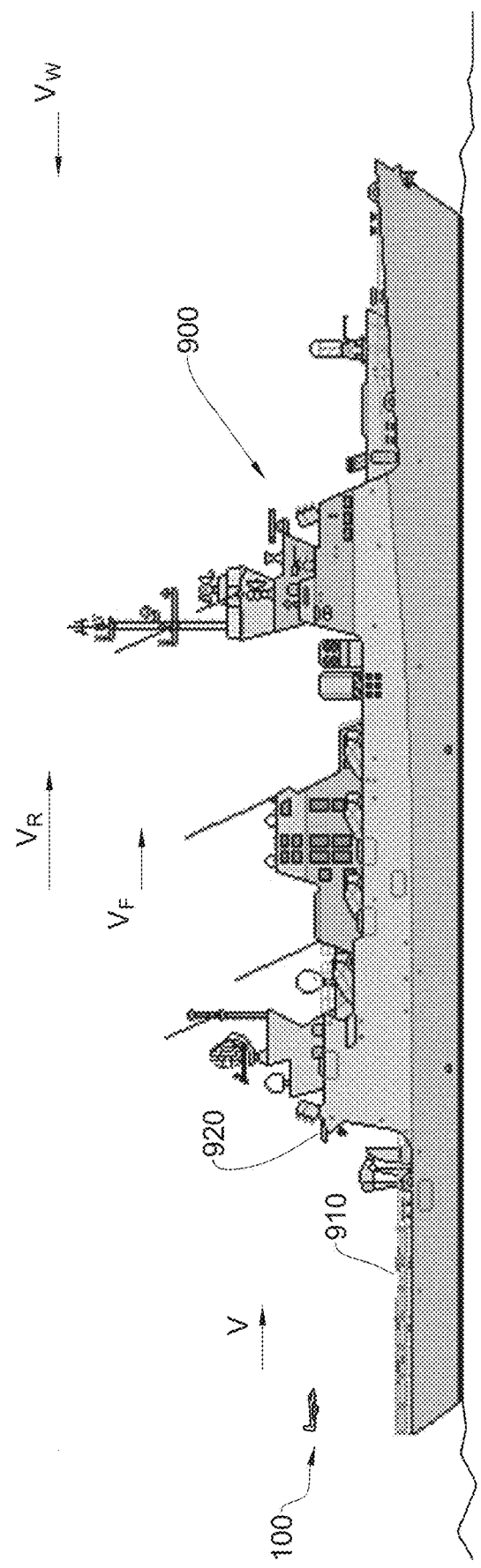
FIG. 9 schematically illustrates a landing maneuver of the example of FIG. 1 with respect to a moving sea platform.

In at least one application according to this aspect of the presently disclosed subject matter, and referring to FIG. 9, the air vehicle 100 is configured for enabling a landing maneuver on a moving platform 900. While such moving platform in this example is in the form of a sea faring ship, in alternative variations of this example the platform 900 can instead be in the form of a moving land vehicle. In yet other alternative variations of this example the platform 900 can instead be static, for example an oil rig or a land base, and for example subject to large head winds.

In at least one implementation of this example, moving platform 900 can be travelling at a non-zero forward speed (i.e., (ground speed) $V_F$, of for example up to about 30 knots or about 32 knots. By ground speed is meant the speed with respect to the earth, rather than with respect to the surrounding fluid medium, for example the water and/or atmosphere. The moving platform 900 can also be travelling for example into the wind in which the windspeed $V_W$ (in the opposite direction to the forward speed $V_F$), can also be for example between 0 knots and 20 knots. In such a case, the relative speed VR of the moving platform 900 with respect to the surrounding atmospheric freestream environment, the relative airspeed of the platform 900, is $V_F + V_W$ (for example 30+(0 to 20) knots. In such a case, the ground speed $V_G$ of the air vehicle 100 can be matched to the forward (ground) speed $V_F$ while ensuring that the concurrent airspeed of the air vehicle 300, which is also matched to the relative speed VR of the platform 900, is above the stall speed $V_{S2}$ of the air vehicle with the DEP 300 operating, preferably with a safety factor of 1.13 or 1.2.

It is to be noted that at least in some in implementations of this example in which the landing pad for the air vehicle 100 is close to and aft of a superstructure, the area above the landing pad may not experience the same relative airspeed as the platform 900, but rather a reduced relative airspeed; on the other hand, such a superstructure can induce separated wake conditions. In such a case, the ground speed $V_G$ of the air vehicle 100 can be matched to the forward (ground) speed $V_F$ while ensuring that the concurrent airspeed of the air vehicle 300, which is less than the relative speed VR of the platform 900 due to the local conditions at the landing pad, is above the stall speed $V_{S2}$ of the air vehicle with the DEP 300 operating, preferably with a safety factor of 1.13 or 1.2.

For example, such a seafaring moving platform 900 can be a Saar V ship, operated by Israel.

In at least some implementations of such examples the moving platform 900 comprises a landing pad 910 equipped with arresting hooks, for example aft of a ship superstructure 920. In at least some conditions, the freestream environment aft of the superstructure 920, in particular aft and over the landing pad 910, can include separated wake conditions.

It is to be noted that at such magnitudes for the platform relative speed VR, the minimum landing air speed of the basic aircraft design 200 is insufficient to enable the basic aircraft design 200 to land on the landing pad 910, mainly in view of the following considerations:

(A) the short length of the landing pad 910 as compared with minimum landing length for the basic aircraft design 200;

(B) the relative large landing speed of basic aircraft design 200, which must be higher than the nominal stall speed $V_{S1}$ for safety, wherein the nominal stall speed $V_{S1}$ exceeds the platform relative speed VR; and (C) the separated wake conditions aft of the superstructure 920 that can potentially adversely affect the generation of lift and controllability of the basic aircraft design 200.

In straight and level flight, stall speed $V_S$ is related to the maximum lift coefficient $C_{Lmax}$ of the air vehicle 100, weight W of the air vehicle 100, wing gross area A of the main lift generating wing arrangement 220, and air density (at the respective altitude, for example sea level, ISA conditions) ρ by the following expression, which is a good approximation at shallow glide angles:

$$V_S = \sqrt{[(2*W)/(\rho*A*C_{Lmax})]}$$

Thus, a reduction of stall speed $V_S$ from the aforementioned nominal stall speed $V_{S1}$ to a (reduced) modified stall speed $V_{S2}$ can be achieved by increasing the maximum lift coefficient $C_L$ of the air vehicle 100 from the nominal maximum lift coefficient $C_{Lmax1}$ to an (increased) modified maximum lift coefficient $C_{Lmax2}$, in which:

$$C_{Lmax2} = C_{Lmax1} * (V_{S1}/V_{S2})^2$$

This increase in maximum lift coefficient $C_L$ of the air vehicle 100 is achieved according to an aspect of the presently disclosed subject matter by operating the DEP 300 (in combination with providing large flap angles for the flaps 222), and the desired value for $C_{Lmax2}$ can be generated to provide the desired reduction in stall speed from the nominal stall speed $V_{S1}$ to the desired modified stall speed $V_{S2}$. This control over the modified maximum lift coefficient $C_{Lmax2}$ can be achieved by suitably controlling the thrust generated by the DEP 300, as well as by controlling the magnitude of the flap angle for the flaps 222. Thus, while the aforesaid operation of the DEP 300 (i.e., in combination with providing desired flap angles for the flaps 222), can provide very large values for modified maximum lift coefficient $C_{Lmax2}$, for example, between 7 and 10, for example about 8 or about 9, it can be desired to operate the DEP 300 (i.e., in combination with providing desired flap angles for the flaps 222), to provide lower values for modified maximum lift coefficient $C_{Lmax2}$, for example, 7, such as to enable operation of the air vehicle 100 with a desired safety margin with respect to the modified stall speed $V_{S2}$.

In the present example, the modified stall speed $V_{S2}$ is chosen to be at or below the maximum expected platform relative air speed VR, such that even with a stall margin of 1.2*$V_{S2}$ the air vehicle 100 can be operated in powered aerodynamic flight at forward air speeds similar to platform relative air speed VR. The result is that relative to the platform 900, and in particular to the landing pad 910, the air vehicle 100 lands effectively vertically, i.e. effectively in a VTOL ("vertical takeoff and landing") manner if the air vehicle 100 air speed matches the actual platform relative air speed VR when the air vehicle 100 is overlying the landing pad 910. Alternatively, the result is that relative to the platform 900, and in particular to the landing pad 910, the air vehicle 100 lands effectively in a short horizontal distance, i.e. effective in a STOL ("short takeoff and landing") manner, or in a very short horizontal distance, i.e. effective in a SSTOL ("super-short takeoff and landing") manner, if the air vehicle 100 air speed is just greater than the actual platform relative air speed VR when the air vehicle 100 is overlying the landing pad 910.

It is to be noted that the DEP 300 can be operated in combination with the flaps 222 such to provide the required modified maximum lift coefficient $C_{Lmax2}$, as well as the required drag coefficient and aggregate thrust TA (including the primary propulsion unit thrust) such as to provide the desired downward glide path defined by the glide angle (γ).

Thus, operating the DEP 300 to provide the desired modified stall speed $V_{S2}$ enables the air vehicle 100 to overcome at least considerations (A) and (B) above.

Furthermore, as the DEP 300 is configured to provide damping of the airflow over the wings in view of the separated wake conditions around the landing pad 910, this feature also enables the air vehicle 100 to overcome at least consideration (C) above.

In this manner, a basic aircraft configuration 200 can be modified to provide the air vehicle 100 by incorporation of the DEP 300 and operation thereof and of the air vehicle 100 as disclosed herein to enable the air vehicle to execute an essentially VTOL landing or SSTOL landing on a moving platform in separated wake conditions, which is not possible solely with the basic aircraft design 200.

It is also to be noted that by configuring at least part of the DEP 300 to provide dampened energized flow over the ailerons 224, roll control can be maintained on the air vehicle 100 at forward speeds much lower than the ailerons 334 were originally designed for in the basic aircraft design 200.

Figure 11:
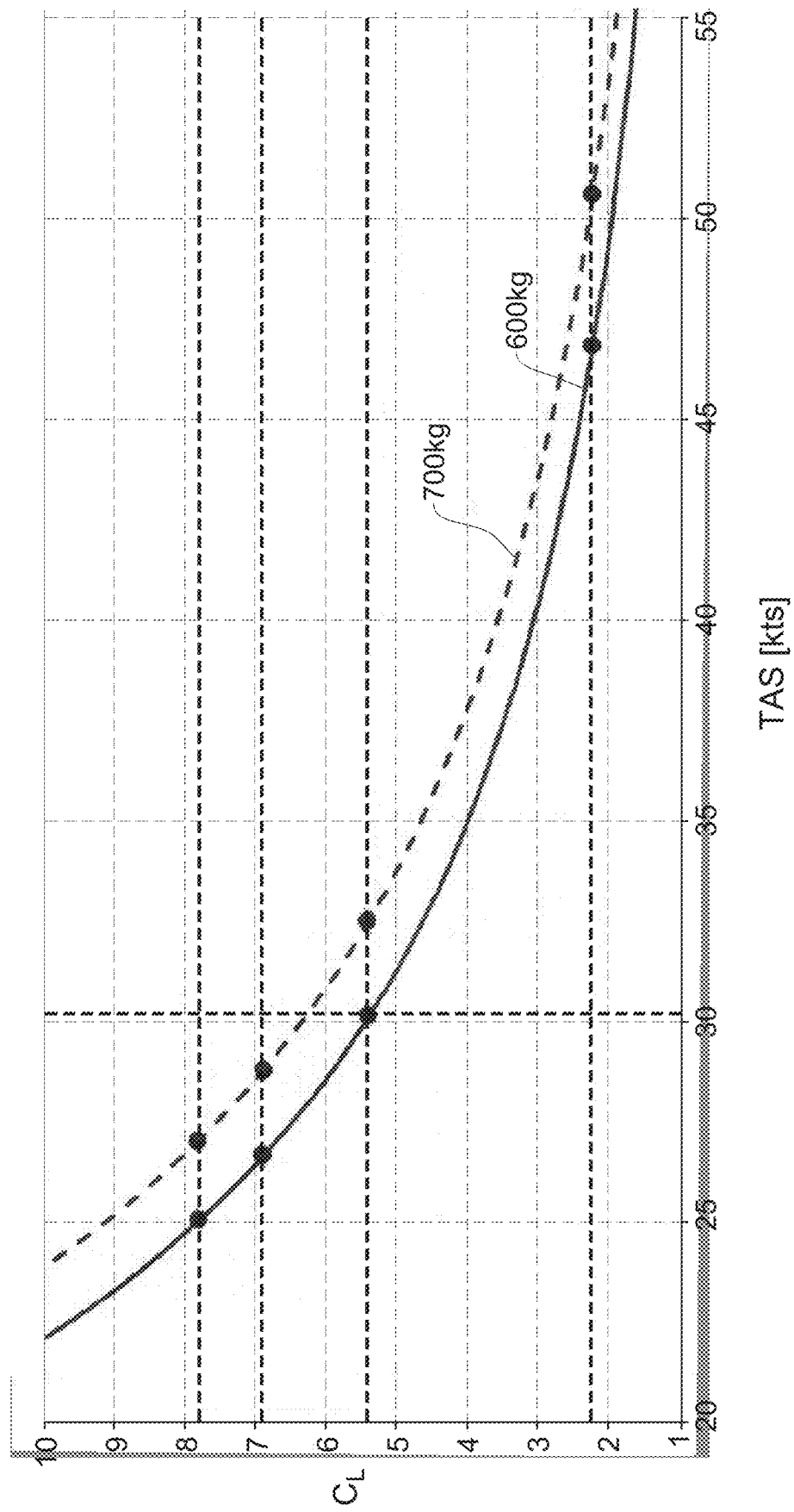
FIG. 11 illustrates lift coefficient vs. airspeed profile for an implementation of the example of FIG. 1.

Referring to FIG. 11, a specific example of the above implementation in which the weight of the air vehicle 100 is about 600 Kg, is based on a basic aircraft configuration 200 having a $C_{Lmax}$ of about 2.2, and nominal stall sped $V_{S1}$ of about 47 knots, whereas the region of interest regarding for the moving platform 900 is a range of forward speed $V_F$ between zero and about 30 knots or about 32 knots. In order to be able to match the moving platform maximum forward speed $V_F$ of about 30 knots or about 32 knots, the DEP 300 can be operated (together with flaps 222) so as to enable the lift coefficient $C_L$ of the air vehicle 100 to increase sufficiently to thereby enable the forward speed of the air vehicle to drop to 30 knots or about 32 knots without stalling, and such a lift coefficient $C_L$ is about 5.4. In such a case, and to maintain a stall margin of $1.2*V_{stall}$, the DEP 300 can be operated (together with flaps 222) so as to enable the maximum lift coefficient $C_{Lmax}$ of the air vehicle 100 to increase to about 7.8. If instead it is decided to apply a different stall margin of $1.13*V_{stall}$, the DEP 300 can be operated (together with flaps 222) so as to enable the maximum lift coefficient $C_{Lmax}$ of the air vehicle $100_{SS}$ to increase to a lower value of about 6.9. FIG. 11 also shows the relationship of a lift coefficient $C_L$ with forward speed as the weight of the air vehicle increases (for example to 700 kg).

It is to be noted that while in the above implementation the forward air speed of the air vehicle 100 can be matched to the forward air speed of the platform 900, and thus there is little or no ground roll. However, in other alternative implementations of this example, in which the platform 900 is static or moving much more slowly than in the above example, the ground roll after touchdown can be significantly reduced when the DEP 300 is operated (together with flaps 222), as compared with the basic aircraft design 200 or when the DEP 300 is not operated.

It is to be noted that in at least some implementations of this example operation of the DEP 300 requires the power output and thrust of all the secondary electrical propulsion units 400 to be nominally identical. In such cases, there is an element of uniformity and simplicity in the spatial arrangement of the DEP 300 with respect to the wing 220.

However, in yet other implementations of this example, this is not necessarily the case, and indeed operation of the DEP 300 does not require in such cases for the power output and thrust of all the secondary electrical propulsion units 400 to be identical.

For example, in at least one implementation of this example, the first subsets, $ST1_I$ and $ST2_I$ respectively, of said first set ST1 of N secondary electrical propulsion units 400 and said second set ST2 of N secondary electrical propulsion units 400, can be operated (in combination with the respective flaps 222) such as to provide the majority of the required increase in air vehicle lift coefficient $C_L$ and in drag coefficient $C_D$ and thereby enable the air vehicle 100 to land on the platform 900.

In such an example, concurrently, the second subsets, $ST1_O$ and $ST2_O$ respectively, of said first set ST1 of N secondary electrical propulsion units 400 and said second set ST2 of N secondary electrical propulsion units 400, can be operated in a manner to only provide sufficient flow over the ailerons 224 to enable the ailerons 224 to provide sufficient control moments in roll to the air vehicle 100 at the required low forward speed, while minimizing the contribution to the air vehicle lift coefficient $C_L$ and forward thrust, providing minimum additional drag, and providing a measure of damping any separated wake conditions that can be present.

Thus, the secondary propulsion units 400 of the first subsets $ST1_I$ and $ST2_I$ can be different in rating and/or design from the secondary propulsion units 400 of the second subsets, $ST1_O$ and $ST2_O$. Additionally or alternatively, the secondary propulsion units 400 of the first subsets $ST1_I$ and $ST2_I$ can be coupled in a different geometrical relationship with respect to the respective wings, and/or operated at a different power or thrust rating, with respect to the secondary propulsion units 400 of the second subsets, $ST1_O$ and $ST2_O$.

Additionally or alternatively, the rotors 450 of the respective secondary propulsion units 400 of the first subsets $ST1_I$ and $ST2_I$ can have the same or a different number of rotor blades with respect to the secondary propulsion units 400 of the second subsets, $ST1_O$ and $ST2_O$, such as to for example enable the first subsets $ST1_I$ and $ST2_I$ to provide maximum augmented lift and enhanced drag, while enabling the second subsets, $ST1_O$ and $ST2_O$ to provide roll control in an efficient manner.

Thus, while the basic aircraft design 200 corresponds to a conventional aircraft configuration, and can have a ground roll of, for example, about 310 m, the corresponding air vehicle 100 can operate, via the DEP 300, selectively as a SSTOL configuration, or selectively as a STOL configuration, depending on how the DEP 300 is operated to provide the desired change in lift coefficient $C_L$ as compared with the basic aircraft design 200.

Figure 12:
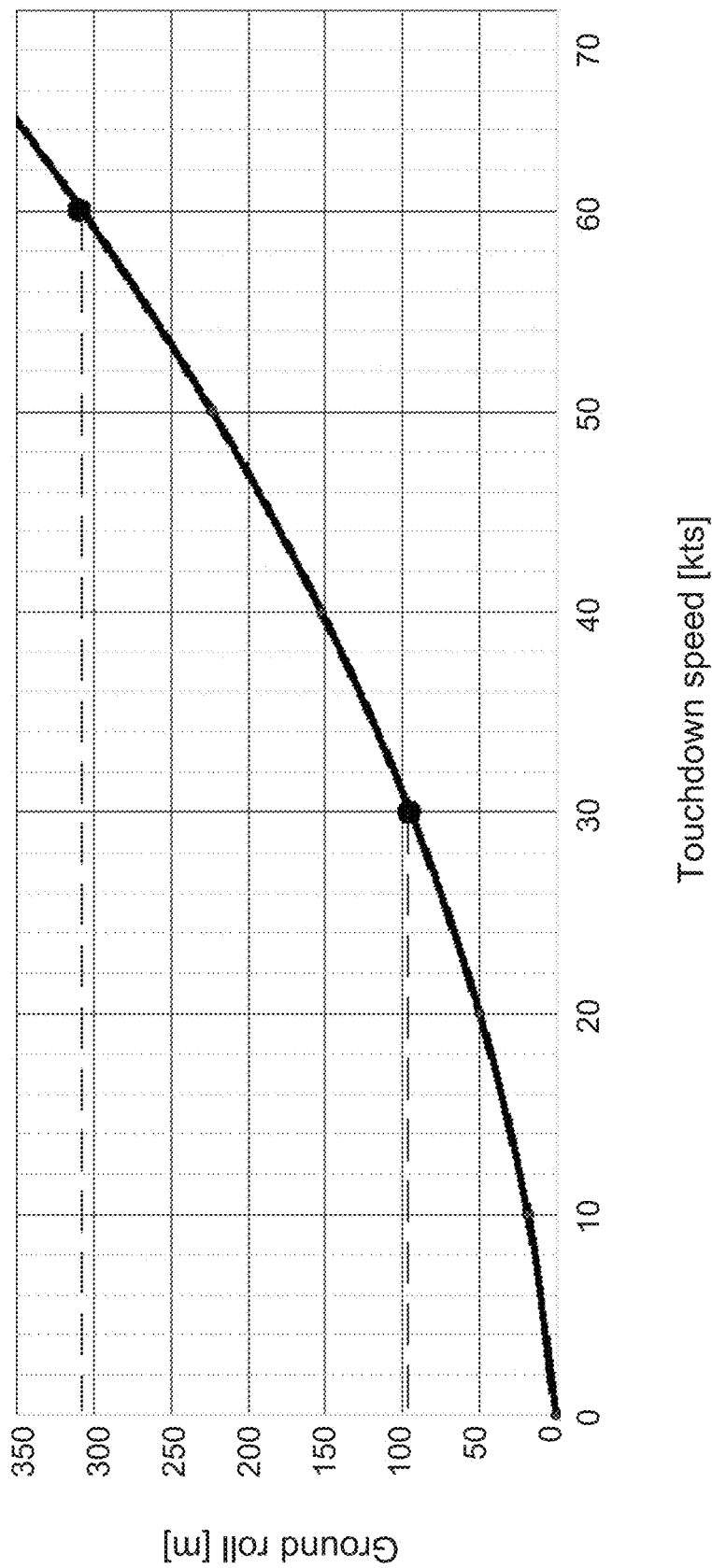
FIG. 12 illustrates ground roll vs. touchdown speed profile for an implementation of the example of FIG. 1.

Referring to FIG. 12, it may be appreciated that the ground roll required for landing the air vehicle 100 varies with touchdown speed. Thus, in an implementation of the above example, in which the basic aircraft design 200 (or alternatively the air vehicle 100) has a landing weight of about 680 Kg, and a touchdown speed of about 60 knots (corresponding to the stall margin speed of 20% above the nominal stall speed $V_S$), the required ground roll is about 310 m. In other words, the basic aircraft design 200 requires a landing area of at least 310 m length.

Also as can be seen in FIG. 12, operation of the DEP 300 in air vehicle 100 to thereby reduce the landing speed to about 30 knots enables the ground roll to be reduced to less than 100 m, a reduction of about 69% as compared with the basic aircraft design 200.

It can also be appreciated that if the moving platform 900 is also moving in the same direction as the air vehicle 100 at a similar ground speed, then the effective ground roll on the platform 900 itself reduces to about zero, and thus the air vehicle 100 essentially executes a vertical landing relative to the moving platform 900.

Optionally the air vehicle 300 can include a suitable sensor for sensing vertical spacing between the air vehicle and a ground surface, such as for example the landing pad of the moving platform 900. A suitable computer can process the vertical spacing data obtained over time during an effectively VTOL landing procedure (i.e., in which the forward airspeed of the air vehicle 100 effectively matches the forward air speed of the moving platform 900), thereby optimizing the vertical velocity and timing to take account of the oscillations of the platform 900, for example due to the sea state, thereby minimizing or eliminating ground hop at landing.

It is to be noted that the DEP 300 of the air vehicle 100 can also be operated in other parts of the flight envelope. For example, the air vehicle 100 can be operated together with the DEP 300 at take-off, providing a shorter take-off ground roll, and higher climb rate, as compared with the basic aircraft design 200. This can facilitate take-off from a moving platform 900, optionally with the aid of a launch catapult and/or booster unit. For example, in implementations of the above examples in which each one of the basic aircraft configuration 200 and the air vehicle 100 has a take-of weight of 680 Kg, computer simulations determine a minimum take-off runway length of about 250 m for the basic aircraft configuration 200, and a minimum take-off runway length of about 50 m for the air vehicle 100 with the DEP 300 (at least the first subsets $ST1_I$ and $ST2_I$) operating at full thrust, and flap angle 20°, providing augmented lift at low drag levels, enabling high take off acceleration.

Thus, in alternative implementations of this example the air vehicle 100 can be operated as a STOL or SSTOL air vehicle when the DEP 300 is operated (together with flaps 222).

Figure 13:
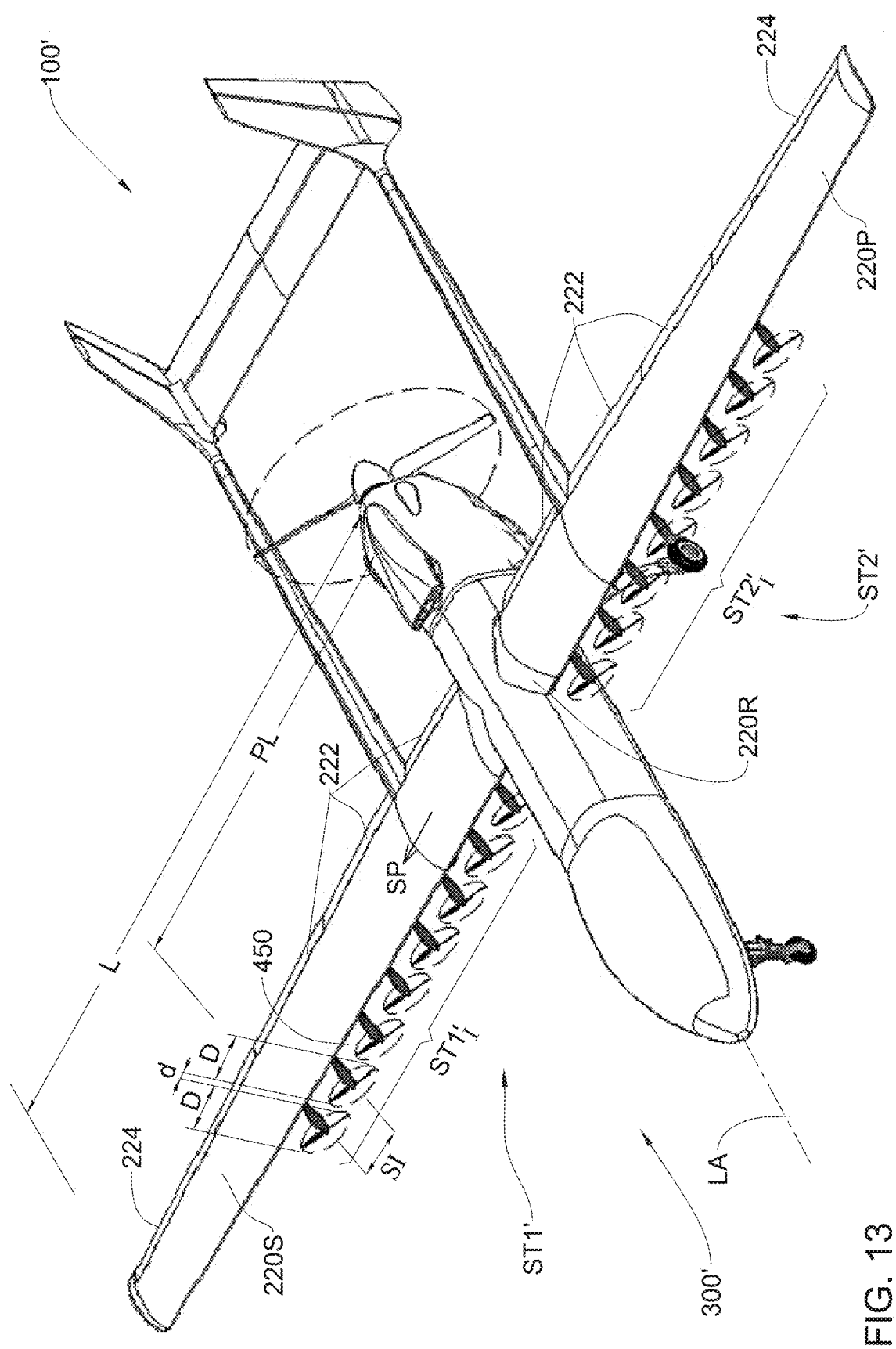
FIG. 13 is an isometric view of an air vehicle according to a second example of the presently disclosed subject matter.

Referring to FIG. 13, a second example of the air vehicle, referred to by reference numeral 100', comprises a modified DEP, referred to by reference numeral 300'.

The air vehicle 100' is thus identical to air vehicle 100 of the example of FIG. 1, and only differs therefrom structurally by the DEP 300' being modified with respect to DEP 300.

The DEP 300' is similar to the DEP 300 as disclosed here, mutatis mutandis, with the main difference that the DEP 300' extends in a spanwise direction over part of the wings 220S and 220P, and is configured for providing direct respective air flows over all the respective flaps 222 of the respective port wing 220P, but not directly over the ailerons 224.

Thus, in the second example, the DEP 300' comprises a smaller number of the aforementioned electrical propulsion units 400 mechanically coupled to the basic aircraft design 200.

In this example, the starboard wing 220S comprises a modified first set ST1' of N' secondary electrical propulsion units 400 mechanically coupled to the starboard wing 220S, and the port wing 220P comprises a modified second set ST2' of N' secondary electrical propulsion units 400 mechanically coupled to the port wing 220P. While in the illustrated example, the integer N' is 8, in alternative variations of this example the integer N' can have any other suitable value.

Also in at least this example, the secondary electrical propulsion units 400 in each one of the first set ST1' and the second set ST2' have the same rotor diameter D. In at least this example, the secondary electrical propulsion units 400 in each one of the first set ST1' and the second set ST2' are spaced from one another in a respective spanwise direction SP from the longitudinal axis LA of the air vehicle 100 at an inter-unit spacing SI such that each respective rotor 450 is laterally spaced from an adjacent rotor by an inter-rotor spacing d, wherein d is significantly smaller than rotor diameter D.

In some examples, the rotors 450 of adjacent secondary electrical propulsion units 400 can be in overlapping relationship such that the planes of such rotors 450 are in longitudinal staggered relationship. In such cases, the inter-rotor spacing to rotor diameter ratio DSR can be zero or negative.

In at least this example, for example, the inter-rotor spacing to rotor diameter ratio DSR can be within any one of the following ranges: 0.15 to 0.00; −0.15 to 0.30; −0.15 to 0.40; 0.05 to 0.40; 0.05 to 0.30; 0.05 to 0.20; 0.05 to 0.15.

In at least this example, for example, the inter-rotor spacing to rotor diameter ratio DSR can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40.

In at least some alternative variations of this example, for example, the inter-rotor spacing to rotor diameter ratio DSR can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.45, 0.50, 0.55, 0.60, 0.65, 0.70, 0.75, 0.80.

Particularly in alternative variations of this example, in which there is less need to provide a damping effect over the wings with respect to the freestream conditions, the inter-rotor spacing to rotor diameter ratio DSR can be also greater than 0.4 or 0.8, for example any one of: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.45, 0.50, 0.55, 0.60, 0.65, 0.70, 0.75, 0.80, 0.81, 0.85, 0.90, 0.95, 0.99, 1.00, 1.05, 1.10, 1.15, 1.20, 1.25, 1.30, 1.35, 1.40, 1.45, 1.50.

Furthermore, the number N' of secondary electrical propulsion units 400 in each one of the first set ST1 and the second set ST2 is such as to span only part PL of the full lateral length L of the respective starboard wing 220S or of the respective port wing 220P, from the respective wing root 220R to the respective wing tip 220T, corresponding to the respective full set of flaps 222.

According to this aspect of the presently disclosed subject matter, the respective first subset, $ST1'_I$ and $ST2'_I$ respectively, identically correspond to the respective said modified first set ST1' of N secondary electrical propulsion units 400 and said modified second set ST2' of N' secondary electrical propulsion units 400, and are mechanically coupled only to an inboard section of the respective starboard wing 220S and port wing 220P.

Thus, the DEP 300', and in particular, the secondary electrical propulsion units 400 of the first subsets $ST1'_I$ and $ST2'1$ are configured for providing respective air flows only with respect to the respective flaps 222 of the respective starboard wing 220S and port wing 220P. In this manner, the specific secondary electrical propulsion units 400 of the first subsets $ST1'_I$ and $ST2'1$ are configured for providing augmented lift as well as enhanced drag by means of the increased airflow provided over the wing, as well as by operating the flaps to a large deflection angle, for example 30° to 40° deflection. For example, the spacing RS, rotor displacement RD, angle η, can be optimized to maximize the augmented lift effect and enhanced drag effect in cooperation with large flap angles.

Also in such an example, the respective secondary electrical propulsion units 400 of the first subsets $ST1'_I$ and $ST2'_I$ can be positioned with respect to the respective starboard wing 220S and port wing 220P such that a majority of the airflow jet generated by the respective rotors 450 is directed to flow over the pressure surfaces 221P, 221S of the respective starboard wing 220S and port wing 220P, to thereby energize the flow over the suction surface via the slot 530, and such that the respective flaps 222 each maximizes its turning effect with respect to this airflow jet, thereby contributing to the augmented lift as well as enhanced drag.

Concurrently, in at least this example, the DEP 300' does not include, i.e., excludes or omits, the second subset, $ST1_O$ and $ST2_O$ respectively, of the first example. Thus, there are no secondary electrical propulsion units 400 coupled to an outboard section of the respective starboard wing 220S and port wing 220P. In particular, there are no secondary electrical propulsion units 400 configured for providing respective air flows directly over the respective ailerons 224 of the respective starboard wing 220S and port wing 220P.

In this example, the air vehicle 100' is operated at forward airspeeds which, while enabling STOL or SSTOL landing maneuvers over a short landing space, is still below the nominal stall speed of the basic aircraft design 200. Thus, such forward speeds are such as to ensure sufficient freestream airflow over the ailerons 224 such as to enable roll control. It is anticipated that in at least nominal operating conditions, the air vehicle 100' will not be under the influence of separated wake flow, and thus additional airflow over the ailerons is not required.

In alternative variations of this example, it is possible to add one or more (but not all) secondary electrical propulsion units 400 of the second subset, $ST1_O$ and $ST2_O$ respectively, of the first example, coupled to an outboard section of the respective starboard wing 220S and port wing 220P such as to provide adequate airflow over the ailerons 224 if it is intended to operate such an example of the air vehicle 300' at a forward speed in which the freestream airflow by itself (over the ailerons 224) is insufficient to generate roll control.

Thus, in the second example, the DEP 300' enables the air vehicle 100' to generate a high aircraft lift coefficient $C_L$ such as to significantly reduce the touchdown speed and correspondingly the landing roll as compared with the basic aircraft design 200, while still enabling controllability via the ailerons 224. In such a case, the ground roll required for STOL or SSTOL landing with air vehicle 100' can be same as or less than that required for the air vehicle 100, but still less than that required for the basic aircraft design 200. Without being bound to theory, inventors consider that in cases in which there is no operation of the outboard secondary electrical propulsion units 400 of the second subsets, $ST1_O$ and $ST2_O$, the inboard secondary electrical propulsion units 400 of the first subsets, $ST1_I$ and $ST2_I$ can be operated to provide maximum thrust to thereby generate maximum augmented lift and enhanced drag, thereby reducing further the airspeed and landing roll of the air vehicle 100'. In contrast, operation of the first example of the air vehicle 100, in which the outboard secondary electrical propulsion units 400 of the second subsets, $ST1_O$ and $ST2_O$ are operated to provide airflow over the ailerons, there is also a thrust component generated by these outboard secondary electrical propulsion units 400, and thus the inboard secondary propulsion units 400 of the first subsets, $ST1_I$ and $ST2_I$ have to be operated at less than full thrust to maintain the same glide angle, and thus relatively increasing the landing speed and ground roll as compared with the air vehicle 100'. On the other hand, in the second example, the air vehicle 100' can essentially carry less weight and can generate less drag, than the air vehicle 100, corresponding to the lower number of secondary electrical propulsion units 400 in the DEP 300' as compared with the DEP 300, in other parts of the flight envelope, for example at cruise.

Also as may be seen in FIG. 12, operation of the DEP 300' in air vehicle 100' to thereby reduce the touch-down speed to about 30 knots enables the ground roll to be reduced from 310 m to about 96 m, a reduction of about 69% as compared with the basic aircraft design 200.

Furthermore, in at least the example of FIG. 13, one or more of the secondary electrical propulsion units 400 of each of the first subsets $ST1_I$ and $ST2_I$ can be operated for providing respective air flows over the respective ailerons 224 of the respective starboard wing 220S and port wing 220P such as to provide yaw control. For example, one or more of the specific secondary electrical propulsion units 400 of the first subsets $ST1_I$ and $ST2_I$ can be operated to provide differential thrust port-starboard, and thereby enable yaw control even at low airspeeds wherein in the absence of operation of the DEP 300' there would otherwise be insufficient airflow over the vertical stabilizers to provide such yaw control.

Figure 14:
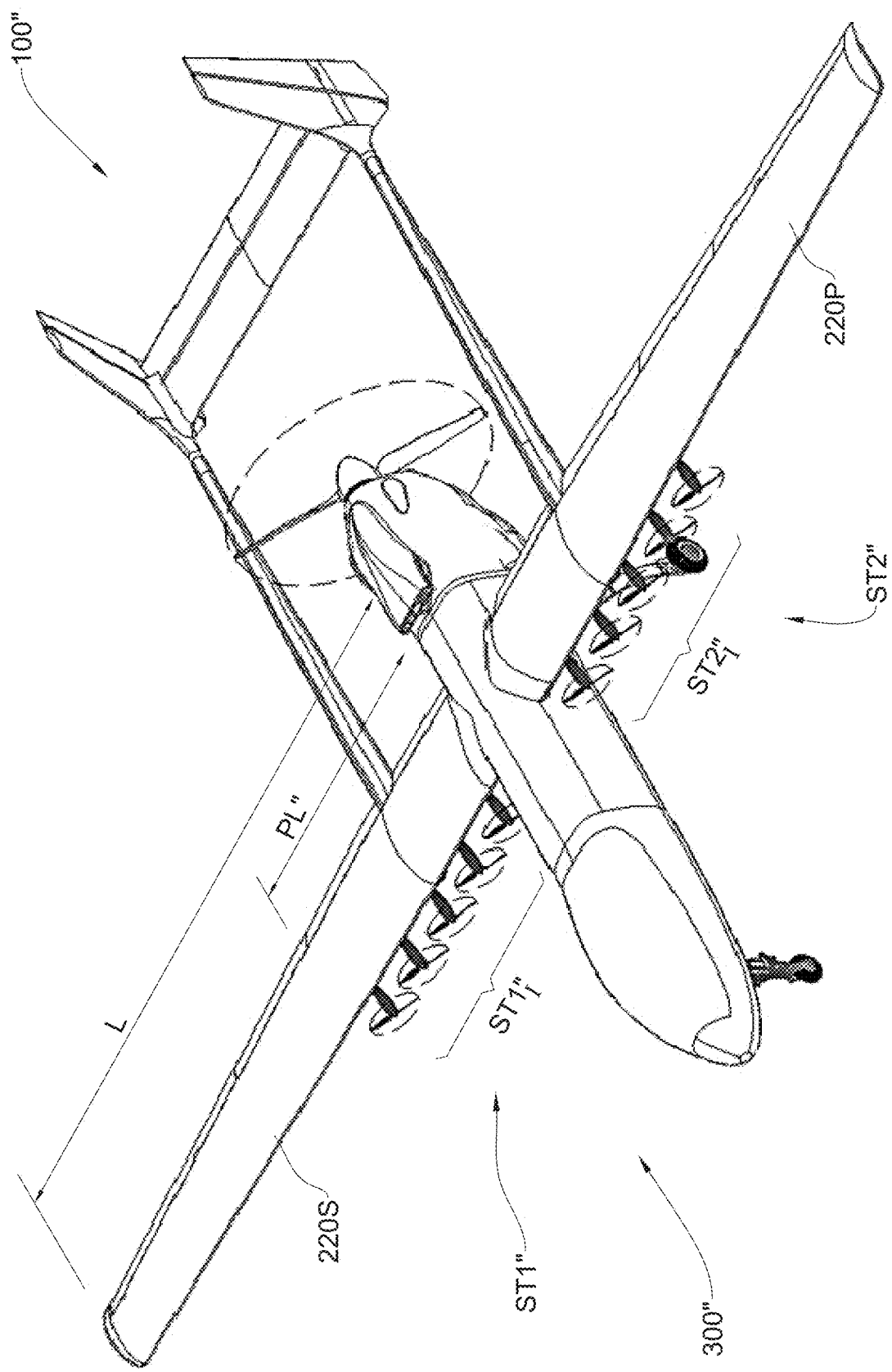
FIG. 14 is an isometric view of an air vehicle according to a third example of the presently disclosed subject matter.

Referring to FIG. 14, a third example of the air vehicle, referred to by reference numeral 100", comprises a further modified DEP, referred to by reference numeral 300".

The air vehicle 100" is thus identical to air vehicle 100 of the example of FIG. 1, or to the air vehicle 100' of the example of FIG. 13, and only differs therefrom structurally by the DEP 300" being modified with respect to DEP 300 or DEP 300'.

The DEP 300" is similar to the DEP 300' as disclosed here, mutatis mutandis, with the main difference that the DEP 300' extends spanwise over the wings 220S and 220P and configured for providing respective air flows over only part of the respective flaps 222 of the respective port wing 220P, and not directly over the other flaps 222 or the ailerons 224. In this example, the DEP 300" is aligned with respect to only the two inboard flaps 222 of each wing.

Thus, in the third example, the DEP 300" comprises a smaller number of the aforementioned electrical propulsion units 400, than DEP 300' or DEP 300.

In this example, the starboard wing 220S comprises a further modified first set ST1" of N" secondary electrical propulsion units 400 mechanically coupled to the starboard wing 220S, and the port wing 220P comprises a further modified second set ST2" of N" secondary electrical propulsion units 400 mechanically coupled to the port wing 220P. While in the illustrated example, the integer N" is 5, in alternative variations of this example the integer N" can have any other suitable value.

Also in at least the third example, the secondary electrical propulsion units 400 in each one of the first set ST" and the second set ST2" have the same rotor diameter D. In at least this example, the secondary electrical propulsion units 400 in each one of the first set ST1" and the second set ST2' are spaced from one another in a respective spanwise direction SP from the longitudinal axis LA of the air vehicle 100 at an inter-unit spacing SI such that each respective rotor 450 is laterally spaced from an adjacent rotor by an inter-rotor spacing d, wherein d is significantly smaller than rotor diameter D.

In some examples, the rotors 450 of adjacent secondary electrical propulsion units 400 can be in overlapping relationship such that the planes of such rotors 450 are in longitudinal staggered relationship. In such cases, the inter-rotor spacing to rotor diameter ratio DSR can be zero or negative.

In at least this example, for example, the inter-rotor spacing to rotor diameter ratio DSR can be within any one of the following ranges: 0.15 to 0.00; −0.15 to 0.30; −0.15 to 0.40; 0.05 to 0.40; 0.05 to 0.30; 0.05 to 0.20; 0.05 to 0.15.

In at least this example, for example, the inter-rotor spacing to rotor diameter ratio DSR can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40.

In at least some alternative variations of this example, for example, the inter-rotor spacing to rotor diameter ratio DSR can be any one of the following values: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.45, 0.50, 0.55, 0.60, 0.65, 0.70, 0.75, 0.80.

Particularly in alternative variations of this example, in which there is less need to provide a damping effect over the wings with respect to the freestream conditions, the inter-rotor spacing to rotor diameter ratio DSR can be also greater than 0.4 or 0.8, for example any one of: −0.15, −0.14, −0.13, −0.12, −0.11, 0.10, 0.09, 0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.2, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.45, 0.50, 0.55, 0.60, 0.65, 0.70, 0.75, 0.80, 0.81, 0.85, 0.90, 0.95, 0.99, 1.00, 1.05, 1.10, 1.15, 1.20, 1.25, 1.30, 1.35, 1.40, 1.45, 1.50.

Furthermore, the number N' of secondary electrical propulsion units 400 in each one of the first set ST1" and the second set ST2" is such as to span only part PL" of the full lateral length L of the respective starboard wing 220S or of the respective port wing 220P, from the respective wing root 220R to the respective wing tip 220T, corresponding to a portion of the full set of flaps 222.

According to this aspect of the presently disclosed subject matter, the secondary electrical propulsion units 400 of the respective first subset, $ST1''_I$ and $ST2''_I$ respectively, are mechanically coupled only to an inboard section of the respective starboard wing 220S and port wing 220P, corresponding to the respective two inboard flaps 222. In an alternative variation of this example, the secondary electrical propulsion units 400 of the respective first subset, $ST1''_I$ and $ST2''_I$ respectively, are mechanically coupled only to a smaller inboard section of the respective starboard wing 220S and port wing 220P, corresponding to the most inboard flap 222. In an alternative variation of this example, the secondary electrical propulsion units 400 of the respective first subset, $ST1''_I$ and $ST2''_I$ respectively, are mechanically coupled only to a smaller inboard section of the respective starboard wing 220S and port wing 220P, corresponding to the only the middle flap 222 or only to the outboard flap 222. In yet another alternative variation of this example, the secondary electrical propulsion units 400 of the respective first subset, $ST1''_I$ and $ST2''_I$ respectively, are mechanically coupled only to a middle/outboard section of the respective starboard wing 220S and port wing 220P, corresponding to the middle flap 222 and the outboard flap 222 of each one of the starboard wing 220S and port wing 220P, respectively.

Thus, the DEP 300", and in particular, the secondary electrical propulsion units 400 of the first subsets $ST1''_I$ and $ST2''_I$ are configured for providing respective air flows only with respect to the inner respective flaps 222 of the respective starboard wing 220S and port wing 220P. In this manner, the specific secondary electrical propulsion units 400 of the first subsets $ST1''_I$ and $ST2''_I$ are configured for providing augmented lift as well as enhanced drag by means of the increased airflow provided over the wing, as well as by operating the flaps to a large deflection angle, for example 30° to 40° deflection. For example, the spacing RS, rotor displacement RD, angle η, are optimized to maximize the augmented lift effect and enhanced drag effect in cooperation with large flap angles.

Also in such an such an example, the respective secondary electrical propulsion units 400 of the first subsets $ST1''_I$ and $ST2''_I$ can be positioned with respect to the respective starboard wing 220S and port wing 220P such that a majority of the airflow jet generated by the respective rotors 450 is directed to flow over the pressure surfaces 221P, 221S of the respective starboard wing 220S and port wing 220P, to thereby energize the flow over the suction surface via the slot 530, and such that the respective inboard flaps 222 each maximizes its turning effect with respect to this airflow jet, thereby contributing to the augmented lift as well as enhanced drag.

Concurrently, in at least this example, the DEP 300" also does not include the second subset, $ST1_O$ and $ST2_O$ respectively, of the first example. Thus, there are no secondary electrical propulsion units 400 coupled to an outboard section of the respective starboard wing 220S and port wing 220P. In particular, there are no secondary electrical propulsion units 400 configured for providing respective air flows directly over the respective ailerons 224 of the respective starboard wing 220S and port wing 220P.

Furthermore, in at least the example of FIG. 14, one or more of the secondary electrical propulsion units 400 of each of the first subsets $ST1_I$ and $ST2_I$ can be operated for providing respective air flows over the respective ailerons 224 of the respective starboard wing 220S and port wing 220P such as to provide yaw control. For example, one or more of the specific secondary electrical propulsion units 400 of the first subsets $ST1_I$ and $ST2_I$ can be operated to provide differential thrust port-starboard, and thereby enable yaw control even at low airspeeds wherein the absence of operation of the DEP 300" there would otherwise be insufficient airflow over the vertical stabilizers to provide such yaw control.

In this example, the air vehicle 100" is operated at forward airspeeds which, while enabling STOL or SSTOL landing maneuvers over a short landing space, is still below the nominal stall speed of the basic aircraft design 200. Thus, such forward speeds are such as to ensure sufficient freestream airflow over the ailerons 224 such as to enable roll control.

Thus, in the second example, the DEP 300" enables the air vehicle 100" to generate a high aircraft lift coefficient $C_L$ such as to significantly reduce the landing roll as compared with the basic aircraft design 200, while still enabling controllability via the ailerons 224. In such a case, the ground roll required for STOL or SSTOL landing with air vehicle 100" is greater than that required for the air vehicle 100, and also greater than that required for air vehicle 100', but less than that required for the basic aircraft design 200.

On the other hand, in the third example, the air vehicle 100" can essentially carry less weight and can essentially generate less drag, than the air vehicle 100 or the air vehicle 100', corresponding to the lower number of secondary electrical propulsion units 400 in the DEP 300" as compared with the DEP 300 or with DEP 300', in other parts of the flight envelope, for example cruise.

Also as may be seen in FIG. 12, operation of the DEP 300" in air vehicle 100" to thereby reduce the touch-down speed to about 40 knots enables the ground roll to be reduced from 310 m to about 150 m, a reduction of about 52% as compared with the basic aircraft design 200.

Thus, air vehicle 300 is particularly suited for flight operations in which it is required to land the air vehicle on a small landing pad in a moving platform, while air vehicle 100' is particularly suited for STOL or SSTOL flight operations in which it is required to land the air vehicle on a small landing area, though larger than the aforesaid landing pad, and while air vehicle 100" is particularly suited for STOL or SSTOL flight operations in which it is required to land the air vehicle on a smaller landing area than the minimum required for the basic aircraft design 200, but larger than the small landing area corresponding to air vehicle 100, or the aforesaid landing pad.

It is to be noted that in the above examples, the corresponding DEP 300 (or DEP 300', or DEP 300") can be integrally or otherwise permanently coupled to the basic aircraft design 200, for example, at factory and concurrently with the assembly of the basic aircraft design 200 to provide the air vehicle 100 (or to respectively provide the air vehicle 100' or the air vehicle 100").

Alternatively, the corresponding DEP 300 (or DEP 300', or DEP 300") can be permanently coupled to the basic aircraft design 200, for example as a retrofit, after the assembly of the basic aircraft design 200 has been completed (and in at least some cases after the basic aircraft design 200 has been flown) to provide the air vehicle 100 (or to respectively provide the air vehicle 100' or the air vehicle 100").

Thus, a user can have a fleet of basic aircraft designs 200, for use within the basic flight envelope thereof, and a second fleet of air vehicles 100 for use when it is required to land on a moving platform, for example a ship, and a third fleet of air vehicles 100' and air vehicles 100" for use when it is required to land on a range of very short landing areas which are too short for safe landing of the basic aircraft design 200, but longer than the moving platform.

Thus, according to an aspect of the presently disclosed subject matter, there is a provided a method for converting a conventional take-off and landing (CTOL) air vehicle design, such as for example the basic aircraft design 200, to a STOL air vehicle configuration or a SSTOL vehicle configuration.

Such a method can comprise the steps:
providing the CTOL air vehicle design, for example basic aircraft design 200, having a main lift generating wing arrangement 220, empennage 230 and main propulsion system 240, the main propulsion system configured for enabling aerodynamic powered flight of the air vehicle within a flight envelope including conventional landing and take off;
coupling a suitable distributed electrical propulsion system, for example DEP 300, or DEP 300', or DEP 300".

According to this aspect of the presently disclosed subject matter, the respective DEP 300 (or the respective DEP 300', or the respective DEP 300") can be provided in kit form and enables the basic aircraft design 200 to be converted to any one of the air vehicles 100, 100' or 100", and back to the basic aircraft design 200. The kit also enables the air vehicle 100 to be reversibly converted to air vehicle 100' or air vehicle 100", and for the air vehicle 100' to be reversibly converted to air vehicle 100 or air vehicle 100", and for the air vehicle 100" to be reversibly converted to air vehicle 100 or air vehicle 100'.

Figure 15:
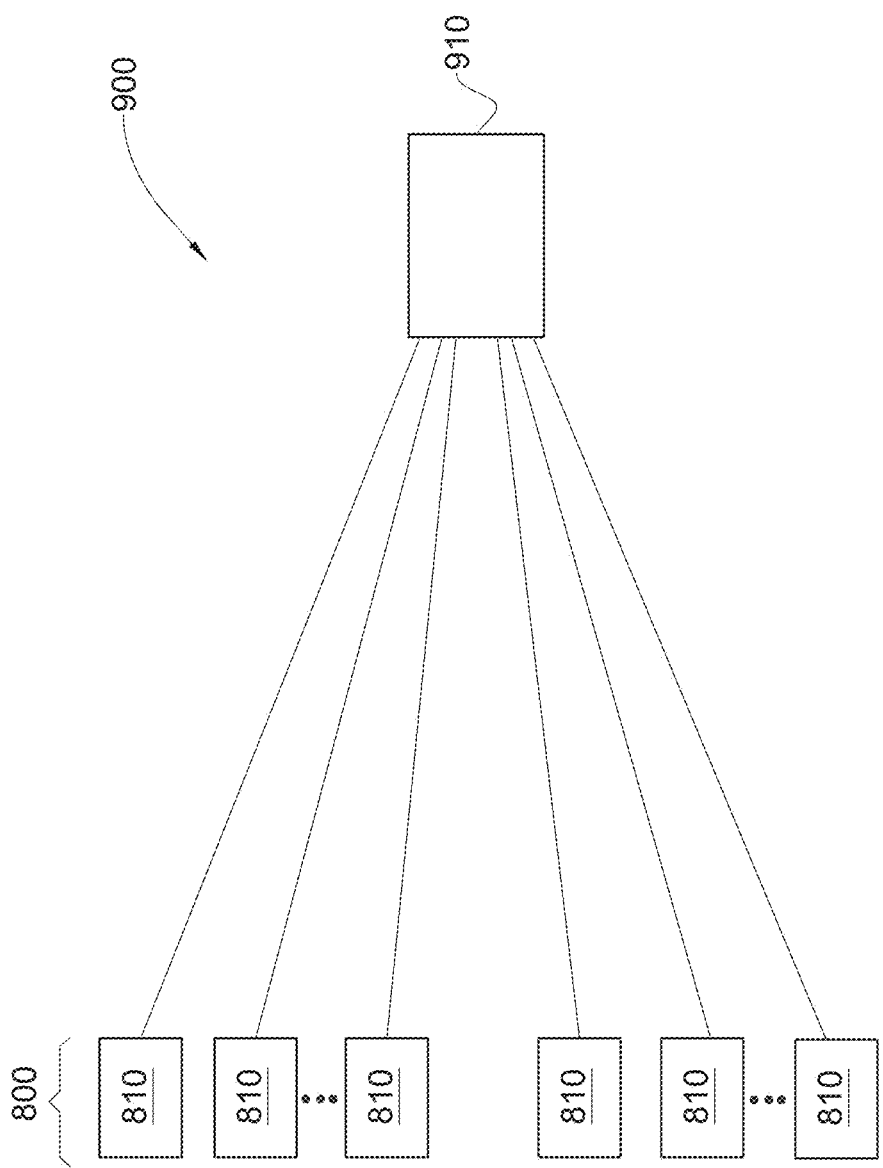
FIG. 15 schematically illustrates a system for converting a conventional take off and landing (CTOL) air vehicle to a short take off and landing (STOL) air vehicle according to an example of the presently disclosed subject matter.

Thus, according to this aspect of the presently discloses subject matter, there is provided a system for converting a CTOL air vehicle configuration to a STOL or SSTOL air vehicle configuration. Referring to FIG. 15, such a system, according to a corresponding first example of the presently discloses subject matter, and generally designated with reference numeral 900, comprises a CTOL air vehicle 910 and a distributed electrical propulsion (DEP) kit 800.

According to this aspect of the presently disclosed subject matter, the CTOL air vehicle 910 is a fully functioning air vehicle, capable of powered aerodynamic flight throughout a corresponding CTOL flight envelope.

In at least this example, the CTOL air vehicle 910 is in the form of the baseline aircraft design 200, as previously disclosed herein, mutatis mutandis.

Thus, the CTOL air vehicle 910, and therefore the baseline aircraft design 200, comprises a fuselage 210, a main lift generating wing arrangement 220, empennage 230, under-carriage 260, and main propulsion system 240, as previously disclosed herein, mutatis mutandis.

Similarly as previously disclosed herein, mutatis mutandis, in at least this example, the main propulsion system 240 is configured for enabling aerodynamic powered flight of the CTOL air vehicle 910 within a baseline flight envelope BSFE, including at least:
(a) (conventional) powered aerodynamic take off, absent installation of or operation of the DEP kit 800; and
(b) (conventional) powered aerodynamic landing, absent installation of or operation of the DEP kit 800.

Thus, in at least this example, the CTOL air vehicle 910 (in the form of basic aircraft design 200, for example) is configured for conventional take off and landing (CTOL) operations, enabling full powered flight of the CTOL air vehicle 910, i.e., absent operation of the DEP kit 800 (or absent the DEP kit 800 itself).

As before, mutatis mutandis, the CTOL air vehicle 910 (in the form of basic aircraft design 200, for example) can be based on or correspond to an existing aircraft design. For example, the basic aircraft design 200 can be based on or correspond to the aircraft design of the T-Heron or variants thereof, provided by Israel Aerospace industries Ltd (IAI), Israel.

In any case, in at least this example, the CTOL air vehicle 910 is configured as an unmanned aerial vehicle (UAV) capable of being operated autonomously and/or automatically and/or via remote control, throughout the whole flight envelope of the basic aircraft design 200. However, in alternative variations of this example, the air vehicle can instead be configured as a manned vehicle, optionally including passengers and/or cargo.

Furthermore, also in at least this example, the CTOL air vehicle 910 is configured as a subsonic air vehicle.

Also as before, mutatis mutandis, in at least this example, and referring again to FIG. 5, the fuselage 210 is of general conventional design, being generally elongate along a longitudinal axis LA of the air vehicle 100, and having a nose 215 and an aft end 216; the main lift generating wing arrangement 220 comprises a port wing 220P and a starboard wing 220S, affixed to the fuselage 210; the port wing 220P and the starboard wing 220S are configured for generating aerodynamic lift; the port wing 220P and the starboard wing 220S each comprise ailerons 224 and flaps 222.

The DEP kit 800 comprises a plurality of secondary electrical propulsion modules 810, each secondary electrical propulsion module 810 being configured for being selectively and reversibly coupled in an operative manner to the CTOL air vehicle 910. By "operative manner" is meant that the selective and reversible coupling is executed in a mechanical manner, and also in a manner allowing operation of each secondary electrical propulsion modules 810 via the controller 600 of the CTOL air vehicle 910.

In particular, each secondary electrical propulsion module 810 is configured for being selectively and reversibly coupled in an operative manner to the main lift generating wing arrangement 220.

Thus, at least in this example, the CTOL air vehicle 910 is further configured for enabling a plurality of said secondary electrical propulsion module 810 to be selectively and reversibly coupled in an operative manner to the main lift generating wing arrangement 220. In at least this example, the CTOL air vehicle 910 is configured for enabling from one to N said secondary electrical propulsion modules 810 to be selectively and reversibly coupled in an operative manner to each one of the port wing 220P and the starboard wing 220S.

Figure 16:
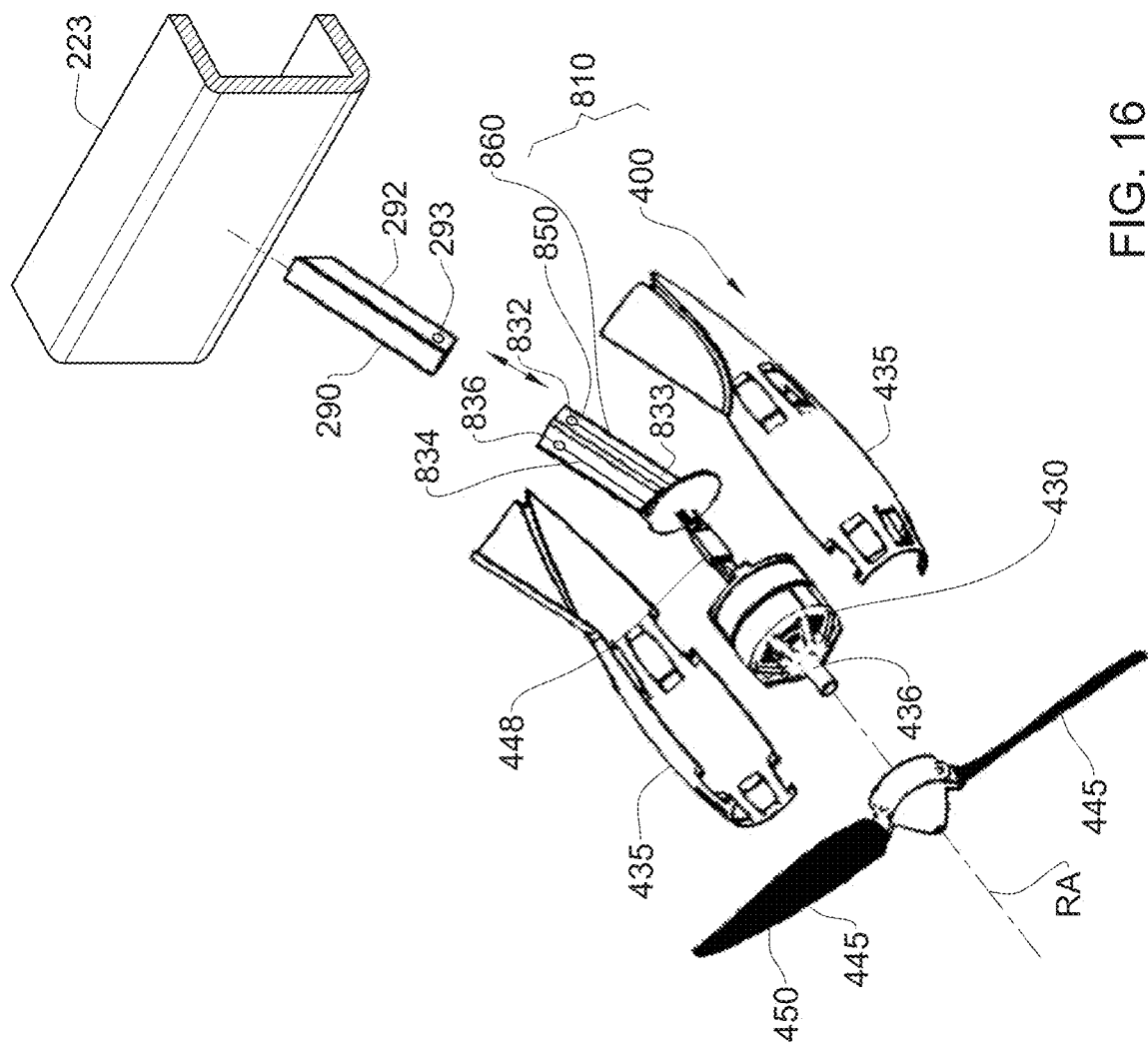
FIG. 16 shows in exploded isometric view, an example of a secondary electrical propulsion module provided by the DEP kit of the example of FIG. 15.
Figure 17:
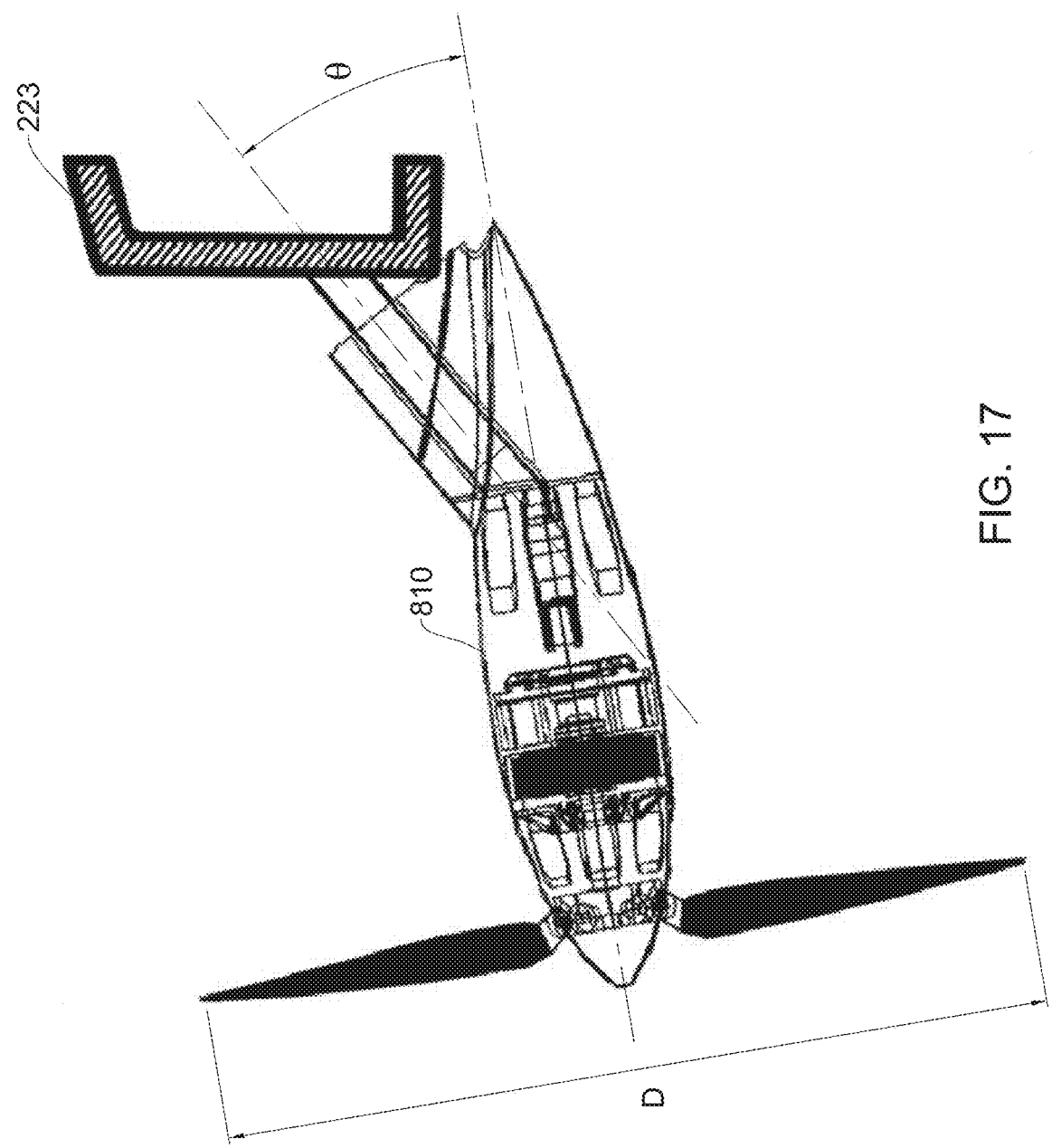
FIG. 17 shows inside view the example of the secondary electrical propulsion module of FIG. 16 when operatively coupled to the wing of the CTOL air vehicle.

Referring also to FIG. 16 and FIG. 17, the CTOL air vehicle 910, and in particular the port wing 220P and the starboard wing 220S each comprises a corresponding plurality of air vehicle body coupling interfaces 290, one per secondary electrical propulsion modules 810. In particular, the port wing 220P and the starboard wing 220S each comprises N air vehicle body coupling interfaces 290, to thereby enable 1 to N secondary electrical propulsion modules 810 to be correspondingly operatively coupled to the CTOL air vehicle 910.

While in this example, N is 12, in alternative variations of this example N can be any other suitable integer.

In at least this example, the number N is chosen such as to enable a maximum of N secondary electrical propulsion modules 810 to be mounted onto each wing 220S, 220P, in a respective spanwise direction SP from the longitudinal axis LA of CTOL air vehicle 910 at an inter-unit spacing SI such that each respective rotor 450 is laterally spaced from an adjacent rotor by an inter-rotor spacing d, wherein d is significantly smaller than rotor diameter D, for example as disclosed herein regarding air vehicle 100 (for example referring to FIGS. 2 and 4), mutatis mutandis.

Referring again in particular to FIG. 16 and FIG. 17, each secondary electrical propulsion module 810 comprises a secondary propulsion unit 400, as previously disclosed herein, mutatis mutandis, and a module operative interface 850.

Thus as before, mutatis mutandis, in at least this example, in each secondary electrical propulsion module 810 the respective secondary electrical propulsion unit 400 comprises an electrical motor unit 430 (which can include one or more electrical motors) that operates to turn a driveshaft 436 about a respective rotor axis RA, and a rotor 450 is mounted to the driveshaft 436. Each motor unit 430 is enclosed in a respective cowling 435. In at least this example, the rotor 450 is in the form of a single propeller having a plurality of blades 445, for example 2, 3, 4, 5 or more blades. The rotor 450 has a respective rotor diameter D, circumscribed by the tips of the blades 445 as they turn about the respective rotor axis RA. An electrical speed controller (ESC) 448 controls rotational speed of the rotor 450 according to command signals from the controller 600. In alternative variations of this example, groups of secondary electrical propulsion module 810 can share the same ESC 448. In yet other alternative variations of this example, groups of electrical motor units 430 can connect the respective ESC 448 to a group controller, which is in turn operatively connected to the controller 600.

In each secondary electrical propulsion module 810 the respective module operative interface 850 is configured for operatively coupling with a corresponding air vehicle body coupling interface 290 to thereby enable operative coupling of the respective secondary electrical propulsion module 810 with the CTOL air vehicle 910, in particular with the main lift generating wing arrangement 220 thereof.

The respective module operative interface 850 in at least this example comprises a load bearing module strut 860, having a first strut end 862 and a longitudinal opposite second strut end 864. The respective electrical motor unit 430 is mechanically mounted to first strut end 862. Other arrangements can be provided for the module operative interface 850.

The second strut end 864 is configured for being mechanically coupled to the air vehicle body coupling interface 290. For example, the air vehicle body coupling interface 290 is in the form of a wing strut 292, for example a rectilinear wing strut, that is mechanically connected to the wing 220, for example to the respective wing spar 223 of the respective port wing 220P or the respective starboard wing 220S, in a load bearing manner.

For example, each one of the port wing 220P and the starboard wing 220S comprises a plurality, for example N, wing struts 292, affixed to the respective port wing 220P or starboard wing 220S and an inter-unit spacing SI between adjacent said wing struts 292, such that to enable the rotor 450 of the respective adjacent secondary electrical propulsion modules 810 (when coupled to the respective wing struts 292) to be laterally spaced from one another by an inter-rotor spacing d, wherein d is significantly smaller than rotor diameter D.

For example, the module strut 860 and the wing strut 292 can be configured as having generally concentric cross-sections, such that the wing strut 292 is received in the internal cavity of module strut 860, or vice versa, and reversibly locked together. Furthermore, the 862 can be configured as a mechanical limit for how far the wing strut 292 can be inserted into the module strut 860.

Furthermore, the cross-section of the module strut 860 and of the wing strut 292 can be non-circular, for example rectangular as illustrated in FIG. 16, to prevent relative rotation between the secondary electrical propulsion module 810 and the respective wing strut 292.

Furthermore, and referring to FIG. 17, while in at least this example the respective angular disposition of the module strut 860 with respect to the rotor axis RA (angle θ) can be fixed for all the secondary electrical propulsion modules 810, the angular disposition of each of the wing struts 292 can also be the same, or alternatively the angular disposition of each of the wing struts 292 different from one another. Furthermore, while the linear length of the module strut 860 can remain the same for all the secondary electrical propulsion modules 810, linear length of each of the wing struts 292 can also be the same or alternatively different from one another. In this manner, it is possible for all the secondary electrical propulsion modules 810 to be mounted to the wing 220 at the same angle and spacing with respect to the wing, or, for the secondary electrical propulsion modules 810 to be mounted to the wing 220, each at different angle and/or spacing with respect to the wing, depending on the specific configuration and spatial positioning of the respective wings struts 292 with respect to the wing 220 or wing spars 223.

A suitable locking system (not shown) is provided for reversibly locking the secondary electrical propulsion modules 810 with respect to the wing 220, for example configured for reversibly locking together the wing struts 292 and respective module struts 860.

In other words, and referring also to FIG. 8, the rotor spacing RS, rotor displacement RD, and rotor axis angle η (i.e., the angle η between the respective rotor axis RA and the chord line CL) at each spanwise location of the secondary electrical propulsion modules 810 can be fixed by length and angular orientation of the respective wing struts 292 with respect to the wing 220 or wing spar 223, for example.

Each secondary electrical propulsion modules 810 has a module electrical coupling 832 and electrical cable 833 connecting the module electrical coupling 832 to the electrical motor unit 430. A complementary wing electrical coupling 293 on or close to the wing strut 292 is in electrical communication with an electrical power source (not shown), for example batteries, comprised in the air vehicle 910, for example inside the main lift generating wing arrangement 220 and/or fuselage 210 via suitable wiring, for example.

Alternatively, the module electrical coupling 832 can be configured for reversibly coupling with the respective electrical speed controller (ESC) 448, which remains with the basic aircraft design 200 after the respective secondary electrical propulsion module 810 is decoupled from the basic aircraft design 200. In such a case, the respective electrical speed controller (ESC) 448 is in electrical communication with the electrical power source.

Additionally or alternatively, the electrical power source can include a suitable electrical generator, for example comprised in the air vehicle 100.

Thus, when each secondary electrical propulsion module 810 is coupled with respect to the wing 220, for example by reversibly coupling together the wing struts 292 and respective module struts 860, the module electrical coupling 832 can be reversibly coupled with the wing electrical coupling 293 (or to the ESC 448 that is in electrical communication with the electrical power source), to thereby provided selective electrical communication between the aforesaid electrical power source of the air vehicle 910, and the respective secondary electrical propulsion module 810.

In at least this example, each electrical motor unit 430 is also directly or indirectly controllable by the control unit 600 (FIG. 1) of the air vehicle 910. For example, each secondary electrical propulsion modules 810 has a module wiring coupling 836 and wiring 834 connecting the module wiring coupling 836 to the control unit (not shown) of the respective electrical motor unit 430. A complementary wing wiring coupling 296 on or close to the wing strut 292 is in communication with controller 600, for example. Thus, when each secondary electrical propulsion module 810 is coupled with respect to the wing 220, for example by reversibly coupling together the wing struts 292 and respective module struts 860, the module wiring coupling 836 can be reversibly coupled with the wing wiring coupling 296, to thereby provided selective communication between the controller 600 and the respective secondary electrical propulsion module 810, thereby enabling control of the respective secondary electrical propulsion module 810 by the controller 600.

The system 900 can be used to convert the CTOL air vehicle 910 to a STOL air vehicle or to an SSTOL air vehicle, for example having a similar configuration to air vehicle 100 as disclosed herein, mutatis mutandis, by operatively coupling N (in this example N=12) secondary electrical propulsion modules 810 to each one of the port wing 220P and the starboard wing 220S, such as to cover the lateral extent of each wing from wing root to wing tip.

For each secondary electrical propulsion module 810, such operative coupling includes mechanically coupling and locking each wing strut 292 with the module strut 860 of the respective secondary electrical propulsion module 810, and electrically coupling the respective module electrical coupling 832 with the respective wing electrical coupling 293 (or to the ESC 448 that is in electrical communication with the electrical power source), to provide selective electrical communication between the aforesaid electrical power source of the air vehicle 910, and the respective secondary electrical propulsion module 810. Furthermore, each secondary electrical propulsion module 810 is operatively coupled to the controller 600 for example by operatively reversibly coupling the module wiring coupling 836 with the wing wiring coupling 296, to thereby provided selective communication between the controller 600 and the respective secondary electrical propulsion module 810, thereby enabling control of the respective secondary electrical propulsion module 810 by the controller 600.

Such a STOL air vehicle configuration or SSTOL air vehicle configuration can thus be operated to land on a moving platform, for example a sea faring platform, as disclosed here for the air vehicle 100, mutatis mutandis.

Alternatively, instead of operatively coupling the full set of N secondary electrical propulsion module 810 to each one of the port wing 220P and the starboard wing 220S, the system 900 can be used for coupling only a smaller number of secondary electrical propulsion module 810, for example in a similar manner to air vehicle 100' of the example of FIG. 13, or for example in a similar manner to air vehicle 100" of the example of FIG. 14, to thereby provide a STOL air vehicle, for example having a similar configuration to air vehicle 100' or air vehicle 100", respectively, as disclosed herein, mutatis mutandis.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. An air vehicle, comprising:
   a main aerodynamic lift generating wing arrangement comprising a port wing and a starboard wing, empennage and main propulsion system, and further comprising a distributed electrical propulsion (DEP) system, wherein the DEP system is different from the main propulsion system, the DEP system comprising a first plurality of secondary electrical propulsion units coupled to each one of said port wing and said starboard wing,
   wherein the main propulsion system is configured for providing sufficient thrust such as to enable powered aerodynamic flight of the air vehicle including at least:
     (a) powered aerodynamic take off absent operation of the DEP system; and
     (b) powered aerodynamic landing absent operation of the DEP system; and
   wherein the DEP system is configured for selectively providing at least augmented lift to the main aerodynamic lift generating wing arrangement in at least landing to thereby increase a maximum lift coefficient of the air vehicle from a nominal maximum lift coefficient to a modified maximum lift coefficient; and
   wherein each secondary electrical propulsion unit is configured for being externally mounted in a single external fixed position with respect to the respective one of said port wing and said starboard wing.

2. The air vehicle according to claim 1, including one of:
   wherein the DEP system is configured for providing said augmented lift to the main aerodynamic lift generating wing arrangement in separated wake conditions and for selectively concurrently generating enhanced drag such as to enable the air vehicle to provide at least powered aerodynamic landing at said separated wake conditions and at a landing air speed less than the nominal stall speed of the air vehicle absent operation of the DEP system;
   wherein the DEP system is configured for providing said augmented lift to the main aerodynamic lift generating wing arrangement in separated wake conditions and for selectively concurrently generating enhanced drag such as to enable the air vehicle to provide at least powered aerodynamic landing at said separated wake conditions and at a landing air speed less than the nominal stall speed of the air vehicle absent operation of the DEP system, and, wherein said separated wake conditions correspond to freestream conditions generally expected on a landing pad of a moving seafaring platform;

wherein the DEP system is configured for providing said augmented lift to the main aerodynamic lift generating wing arrangement in separated wake conditions and for selectively concurrently generating enhanced drag such as to enable the air vehicle to provide at least powered aerodynamic landing at said separated wake conditions and at a landing air speed less than the nominal stall speed of the air vehicle absent operation of the DEP system, and, wherein said landing air speed is an airspeed not greater than 30 knots or not greater than 32 knots; or wherein the DEP system is configured for providing said augmented lift to the main aerodynamic lift generating wing arrangement in separated wake conditions and for selectively concurrently generating enhanced drag such as to enable the air vehicle to provide at least powered aerodynamic landing at said separated wake conditions and at a landing air speed less than the nominal stall speed of the air vehicle absent operation of the DEP system, and, wherein said separated wake conditions correspond to freestream conditions generally expected on a landing pad of a moving seafaring platform, and, wherein said landing air speed is an airspeed not greater than 30 knots or not greater than 32 knots.

3. The air vehicle according to claim 1, wherein said DEP system is optimized for damping separated wake conditions over the lift generating wing arrangement while providing augmented lift and enhanced drag.

4. The air vehicle according to claim 1, including at least one of the following:

wherein the air vehicle comprises a control system configured for operating said DEP system to execute a landing maneuver wherein each said first plurality of said secondary electrical propulsion units is mechanically coupled to the respective said port wing or the respective said starboard wing;

wherein each said secondary electrical propulsion units is coupled to the main aerodynamic lift generating wing arrangement via a respective coupling;

wherein each said secondary electrical propulsion units comprises an electrical motor unit that is configured for operating to turn a respective driveshaft about a respective rotor axis, and a respective rotor mounted to the driveshaft;

wherein each said secondary electrical propulsion units comprises an electrical motor unit that is configured for operating to turn a respective driveshaft about a respective rotor axis, and a respective rotor mounted to the driveshaft, and, wherein each rotor is in the form of a single propeller having a plurality of blades;

wherein each said secondary electrical propulsion units comprises an electrical motor unit that is configured for operating to turn a respective driveshaft about a respective rotor axis, and a respective rotor mounted to the driveshaft; or wherein each said secondary electrical propulsion units comprises an electrical motor unit that is configured for operating to turn a respective driveshaft about a respective rotor axis, and a respective rotor mounted to the driveshaft, and, wherein each rotor is in the form of a single propeller having a plurality of blades, and, wherein each said rotor has a respective rotor diameter, circumscribed by the tips of the respective blades as they turn about the respective rotor axis, and, wherein the secondary electrical propulsion units of each one of said first plurality of secondary electrical propulsion units are spaced over each one of said port wing and said starboard wing at an inter-rotor spacing between each adjacent pair of said secondary electrical propulsion units, wherein said inter-rotor spacing are each less than a respective rotor diameter of the respective said rotor of the respective adjacent pair of said secondary electrical propulsion units.

5. The air vehicle according to claim 1, wherein each one of said port wing and said starboard wing comprises a flap arrangement and an aileron arrangement, and wherein each said first plurality of secondary electrical propulsion units comprises a respective first set of secondary electrical propulsion units coupled to the respective port wing or starboard wing such as to provide corresponding jet flows directly to the full flap arrangement of the respective said port wing or starboard wing, and a respective second set of secondary electrical propulsion units coupled to the respective port wing or starboard wing such as to provide corresponding jet flows directly to the aileron arrangement of the respective said port wing or starboard wing.

6. The air vehicle according to claim 1, wherein said secondary electrical propulsion units of each said first plurality are laterally distributed over the full length of the respective said port wing or starboard wing.

7. The air vehicle according to claim 1, wherein the DEP system is configured for providing control moments in roll at air speed less than the nominal stall speed of the air vehicle absent operation of the DEP system.

8. The air vehicle according to claim 4, including one of:

wherein each one of said port wing and said starboard wing comprises a flap arrangement and an aileron arrangement, and wherein said secondary electrical propulsion units each said first plurality of secondary electrical propulsion units are coupled to the respective port wing or starboard wing such as to provide corresponding jet flows directly only to the full flap arrangement of the respective said port wing or starboard wing; or wherein each one of said port wing and said starboard wing comprises a flap arrangement and an aileron arrangement, and wherein said secondary electrical propulsion units each said first plurality of secondary electrical propulsion units are coupled to the respective port wing or starboard wing such as to provide corresponding jet flows directly only to the part of the flap arrangement of the respective said port wing or starboard wing.

9. The air vehicle according to claim 4, wherein said secondary electrical propulsion units of each said first plurality are laterally distributed over a portion of the length of the respective said port wing or starboard wing.

10. The air vehicle according to claim 1, wherein each one of said port wing and said starboard wing is based on a two-element aerofoil design along the full span of the respective said port wing or starboard wing.

11. The air vehicle according to claim 1, including at least one of:

wherein the air vehicle is configured for providing control moments in pitch at air speeds less than the nominal stall speed of the air vehicle absent operation of the DEP system; or wherein the DEP system is configured for providing control moments in yaw at air speed less than the nominal stall speed of the air vehicle absent operation of the DEP system.

12. A method for landing an air vehicle on a moving platform under separated wake conditions, the method comprising:
   (a) providing an air vehicle as defined in claim 2;
   (b) operating the air vehicle to carry out a landing maneuver comprising:
       at a predetermined altitude and range from the platform, operating the DEP system to enable generating said augmented lift and said enhanced drag to the air vehicle;
       operating the air vehicle to match the ground speed of the air vehicle to the ground speed of the platform;
       reducing altitude of the air vehicle until touchdown on the platform.

13. The method according to claim 12, including at least one of:
   wherein said air vehicle is travelling at a forward air speed that is less than said nominal stall speed;
   operating the DEP system to provide control moments in roll at air speed significantly less than the nominal stall speed of the air vehicle absent operation of the DEP system and at separated wake conditions;
   operating the main propulsion unit to provide enhanced airflow over at least part of the empennage to thereby provide control moments in at pitch at air speed significantly less than the nominal stall speed of the air vehicle absent operation of the DEP system and at separated wake conditions.

14. The method according to claim 12, including one of:
   wherein said moving platform comprises a seafaring vessel;
   wherein said seafaring vessel comprises a superstructure forward of a landing pad of the seafaring vessel, and wherein said superstructure generates said separated wake conditions at said landing pad.

15. The method according to claim 12, wherein said platform forward air speed is about 30 knots or about 32 knots.

16. A method for converting a conventional take off and landing (CTOL) air vehicle to a short take off and landing (STOL) air vehicle or to a super short take off and landing (SSTOL) air vehicle, the method comprising:
   (A) providing the CTOL air vehicle, the CTOL air vehicle comprising a main aerodynamic lift generating wing arrangement comprising a port wing and a starboard wing, empennage and main propulsion system, the main propulsion system configured for enabling powered aerodynamic flight of the air vehicle within a flight envelope including at least conventional landing and take off;
   (B) providing a distributed electrical propulsion system (DEP system), wherein the DEP system is different from the main propulsion system, the DEP system comprising a two first pluralities of secondary electrical propulsion units, wherein the DEP system is configured for selectively providing at least augmented lift to the main aerodynamic lift generating wing arrangement in at least landing to thereby increase a maximum lift coefficient of the air vehicle from a nominal maximum lift coefficient to a modified maximum lift coefficient;
   (C) coupling one of said two first plurality of secondary electrical propulsion units to said port wing, and coupling the other one of said two first plurality of secondary electrical propulsion units to said starboard wing, wherein each secondary electrical propulsion unit is configured for being externally mounted in a single fixed position with respect to the respective one of said port wing and said starboard wing.

17. The method according to claim 16, including at least one of:
   wherein the DEP system is configured for providing said augmented lift to the main aerodynamic lift generating wing arrangement in separated wake conditions and for selectively concurrently generating enhanced drag such as to enable the air vehicle to provide at least powered aerodynamic landing at said separated wake conditions and at a landing air speed less than the nominal stall speed of the air vehicle absent operation of the DEP system; or
   wherein each said secondary electrical propulsion units comprises an electrical motor unit that is configured for operating to turn a respective driveshaft about a respective rotor axis, and a respective rotor mounted to the driveshaft, each rotor having a respective rotor diameter, and wherein in step (C) the secondary electrical propulsion units of each one of said first plurality of secondary electrical propulsion units are spaced over each one of said port wing and said starboard wing at an inter-rotor spacing between each adjacent pair of said secondary electrical propulsion units, wherein said inter-rotor spacing are each less than a respective rotor diameter of the respective said rotor of the respective adjacent pair of said secondary electrical propulsion units.

18. The method according to claim 16, wherein each one of said port wing and said starboard wing comprises a flap arrangement and an aileron arrangement, and including one of the following:
   wherein in step (C) a respective first set of secondary electrical propulsion units of each said first plurality of secondary electrical propulsion units is coupled to the respective port wing or starboard wing such as to provide corresponding jet flows directly to the full flap arrangement of the respective said port wing or starboard wing, and a respective second set of secondary electrical propulsion units each of each said first plurality of secondary electrical propulsion units is coupled to the respective port wing or starboard wing such as to provide corresponding jet flows directly to the aileron arrangement of the respective said port wing or starboard wing;
   wherein in step (C) a respective first set of secondary electrical propulsion units of each said first plurality of secondary electrical propulsion units is coupled to the respective port wing or starboard wing such as to provide corresponding jet flows directly only to the full flap arrangement of the respective said port wing or starboard wing;
   wherein each one of said port wing and said starboard wing comprises a flap arrangement and an aileron arrangement, and wherein in step (C) a respective first set of secondary electrical propulsion units of each said first plurality of secondary electrical propulsion units is coupled to the respective port wing or starboard wing such as to provide corresponding jet flows directly only to a portion of said flap arrangement of the respective said port wing or starboard wing; or wherein each one of said port wing and said starboard wing comprises a flap arrangement and an aileron arrangement, and wherein in step (C) a respective first set of secondary electrical propulsion units of each said first plurality of secondary electrical propulsion units is coupled to the respective port wing or starboard wing such as to provide corresponding jet flows directly only to a portion of said flap arrangement of the respective said port wing or starboard wing, and, wherein in step (C) said secondary electrical propulsion units of each said first plurality are laterally distributed over a portion of the length of the respective said port wing or starboard wing.

19. A kit for converting a conventional take off and landing (CTOL) air vehicle configuration to a short take off and landing (STOL) air vehicle configuration or to a super short take off and landing (SSTOL) air vehicle configuration, the CTOL air vehicle configuration comprising a main aerodynamic lift generating wing arrangement comprising a port wing and a starboard wing, empennage and main propulsion system, the main propulsion system configured for enabling powered aerodynamic flight of the air vehicle within a flight envelope including at least conventional landing and take off, the kit comprising:

a plurality of secondary electrical propulsion modules, each said secondary propulsion unit module configured for being selectively and removably coupled to the CTOL air vehicle configurations to provide a variety of different STOL air vehicle, and wherein when coupled to the CTOL air vehicle configuration the plurality of secondary electrical propulsion modules provide a DEP system, wherein the DEP system is different from the main propulsion system, the DEP system configured, when coupled to the CTOL air vehicle configuration, for selectively providing at least augmented lift to the main aerodynamic lift generating wing arrangement in at least landing to thereby increase a maximum lift coefficient of the air vehicle from a nominal maximum lift coefficient to a modified maximum lift coefficient, and wherein the kit is configured for ensuring that, when thus coupled, each secondary electrical propulsion unit is externally mounted in a single fixed position with respect to a respective one of said port wing and said starboard wing.

20. The kit according to claim 19, including one of the following:

wherein each said secondary propulsion unit module comprises an electrical motor unit that is configured for operating to turn a respective driveshaft about a respective rotor axis, and a respective rotor mounted to the driveshaft;

wherein each said secondary propulsion unit module comprises an electrical motor unit that is configured for operating to turn a respective driveshaft about a respective rotor axis, and a respective rotor mounted to the driveshaft, and, wherein each rotor is in the form of a single propeller having a plurality of blades;

wherein each said secondary propulsion unit module comprises an electrical motor unit that is configured for operating to turn a respective driveshaft about a respective rotor axis, and a respective rotor mounted to the driveshaft, and, comprising an electrical speed controller (ESC) configured for controlling rotational speed of the respective rotor according to command signals from a controller configured for controlling the DEP system;

wherein each said secondary propulsion unit module comprises an electrical motor unit that is configured for operating to turn a respective driveshaft about a respective rotor axis, and a respective rotor mounted to the driveshaft, and, comprising an electrical speed controller (ESC) configured for controlling rotational speed of the respective rotor according to command signals from a controller configured for controlling the DEP system, and, wherein groups of said secondary electrical propulsion modules share the same ESC;

wherein each said secondary propulsion unit module comprises an electrical motor unit that is configured for operating to turn a respective driveshaft about a respective rotor axis, and a respective rotor mounted to the driveshaft, and, comprising an electrical speed controller (ESC) configured for controlling rotational speed of the respective rotor according to command signals from a controller configured for controlling the DEP system, and, wherein groups of said secondary electrical propulsion modules connect the respective ESC to a group controller, which is in turn operatively connected to a controller configured for controlling the DEP system;

wherein each said secondary propulsion unit module is reversibly mechanically coupleable to a respective said wing via a respective coupling;

wherein each said secondary propulsion unit module is reversibly mechanically coupleable to a respective said wing via a respective coupling, and, wherein said coupling comprises a respective module operative interface configured for operatively coupling with a corresponding air vehicle body coupling interface affixed to the CTOL air vehicle configuration, to thereby enable operative coupling of the respective secondary electrical propulsion module with the CTOL air vehicle configuration.

21. The kit according to claim 19, wherein each said secondary propulsion unit module is reversibly mechanically coupleable to a respective said wing via a respective coupling, and, wherein said coupling comprises a respective module operative interface configured for operatively coupling with a corresponding air vehicle body coupling interface affixed to the CTOL air vehicle configuration, to thereby enable operative coupling of the respective secondary electrical propulsion module with the CTOL air vehicle configuration, and, wherein the module operative interface comprises a load bearing module strut, having a first strut end and a longitudinal opposite second strut end, wherein the respective electrical motor unit is mechanically mounted to first strut end, and wherein the second strut end is configured for being mechanically coupled to the air vehicle body coupling interface.

22. An air vehicle, comprising:

a main aerodynamic lift generating wing arrangement comprising a port wing and a starboard wing, empennage and main propulsion system, and further comprising a distributed electrical propulsion (DEP) system, wherein the DEP system is different from the main propulsion system, the DEP system comprising a first plurality of secondary electrical propulsion units coupled to each one of said port wing and said starboard wing, wherein the main propulsion system is configured for providing sufficient thrust such as to enable powered aerodynamic flight of the air vehicle including at least:

(a) powered aerodynamic take off absent operation of the DEP system; and
(b) powered aerodynamic landing absent operation of the DEP system; and wherein the DEP system is configured for selectively providing at least augmented lift to the main aerodynamic lift generating wing arrangement in at least landing to thereby increase a maximum lift coefficient of the air vehicle from a nominal maximum lift coefficient to a modified maximum lift coefficient; and wherein each secondary electrical propulsion unit is externally mounted in a single external fixed position with respect to the respective one of said port wing and said starboard wing.

* * * * *